(12) United States Patent
Barth

(10) Patent No.: US 9,499,042 B2
(45) Date of Patent: Nov. 22, 2016

(54) HYBRID VEHICLE DRIVETRAIN

(71) Applicant: BRP-POWERTRAIN GMBH & CO. KG, Gunskirchen (AT)

(72) Inventor: Andreas Barth, Weibern (AT)

(73) Assignee: BRP-POWERTRAIN GMBH & CO. KG, Gunskirchen (AT)

( * ) Notice: Subject to any disclaimer, the term of this patent is extended or adjusted under 35 U.S.C. 154(b) by 0 days.

(21) Appl. No.: 14/348,111

(22) PCT Filed: Sep. 28, 2012

(86) PCT No.: PCT/US2012/057865
§ 371 (c)(1),
(2) Date: Mar. 28, 2014

(87) PCT Pub. No.: WO2013/049536
PCT Pub. Date: Apr. 4, 2013

(65) Prior Publication Data
US 2014/0238758 A1  Aug. 28, 2014

Related U.S. Application Data

(60) Provisional application No. 61/541,513, filed on Sep. 30, 2011.

(51) Int. Cl.
*B60K 6/547* (2007.10)
*B60K 6/48* (2007.10)
(Continued)

(52) U.S. Cl.
CPC ............... *B60K 6/547* (2013.01); *B60K 6/48* (2013.01); *F16H 61/0213* (2013.01);
(Continued)

(58) Field of Classification Search
CPC .. B60K 6/54; B60K 6/547; B60Y 2200/122; B60Y 2200/92; Y10S 903/917; F16H 61/0213; F16H 63/18
See application file for complete search history.

(56) References Cited

U.S. PATENT DOCUMENTS 5,542,309 A  8/1996  Wenger et al.
6,497,635 B2 * 12/2002  Suzuki .............................. 477/3
(Continued)

FOREIGN PATENT DOCUMENTS

CN  101448665 A  6/2009
CN  101918256 A  12/2010
(Continued)

OTHER PUBLICATIONS

International Search Report of PCT/US2012/057865, Dec. 27, 2012; Blaine R. Copenheaver.
(Continued)

*Primary Examiner* — John Walters
*Assistant Examiner* — Brian Swenson
(74) *Attorney, Agent, or Firm* — BCF LLP

(57) ABSTRACT

A drivetrain for a hybrid vehicle has at least one ground engaging element, a torque transmission shaft operatively connected thereto, an electric motor, a transmission having an input shaft and an output shaft, and an internal combustion engine operatively connected to the input shaft of the transmission. The electric motor and the output shaft are operatively connected to the torque transmission shaft. The transmission has a neutral shift position, a first shift position, and at least one higher shift position including a highest shift position. The transmission is capable of shifting directly from the neutral shift position to the first shift position and directly from the neutral shift position to the highest shift position. A vehicle having the drivetrain is also disclosed. A method of starting an internal combustion engine in a hybrid vehicle is also disclosed.

20 Claims, 24 Drawing Sheets

(51) Int. Cl.
*F16H 61/02* (2006.01)
*F16H 63/18* (2006.01)

(52) U.S. Cl.
CPC ........ *F16H 63/18* (2013.01); *B60Y 2200/122* (2013.01); *B60Y 2200/92* (2013.01); *Y02T 10/6221* (2013.01); *Y10S 903/917* (2013.01); *Y10T 74/19014* (2015.01)

(56) References Cited

U.S. PATENT DOCUMENTS

| | | | |
|---|---|---|---|
| 7,474,012 B2* | 1/2009 | Tabata et al. | 290/40 C |
| 8,002,062 B2 | 8/2011 | Saitou | |
| 8,167,752 B2 | 5/2012 | Houle | |
| 8,260,535 B2 | 9/2012 | Dagenais | |
| 8,380,409 B2* | 2/2013 | Matsubara et al. | 701/67 |
| 8,577,588 B2 | 11/2013 | Dagenais | |
| 9,020,744 B2 | 4/2015 | Dagenais | |
| 2001/0023666 A1* | 9/2001 | Suzuki | 123/2 |
| 2003/0104901 A1 | 6/2003 | Fukushima et al. | |
| 2003/0190995 A1 | 10/2003 | Aoki | |
| 2004/0254039 A1* | 12/2004 | Yasui et al. | 475/5 |
| 2007/0227283 A1 | 10/2007 | Fujimoto et al. | |
| 2009/0084623 A1 | 4/2009 | Dagenais | |
| 2009/0165582 A1 | 7/2009 | Tsunashima et al. | |
| 2009/0205455 A1 | 8/2009 | Kosugi | |
| 2009/0221390 A1 | 9/2009 | Houle | |
| 2010/0138086 A1 | 6/2010 | Imamura et al. | |
| 2011/0073391 A1 | 3/2011 | Hanawa et al. | |
| 2011/0114403 A1 | 5/2011 | Hauger et al. | |

FOREIGN PATENT DOCUMENTS

| | | |
|---|---|---|
| DE | 102007000672 A1 | 5/2008 |
| EP | 2322822 A1 | 5/2011 |
| JP | 2010100179 A | 5/2010 |

OTHER PUBLICATIONS

Supplementary Partial European Search Report of European Application No. 12836328.0; EPO; Oliver Wurzer; Munich; Aug. 27, 2015.
English abstract of CN101918256A retrieved from http://worldwide.espacenet.com/ on Feb. 12, 2016.
English abstract of CN101448665A retrieved from http://worldwide.espacenet.com/ on Feb. 12, 2016.
Supplementary European Search Report of European Application No. 12836328.0; EPO; Oliver Wurzer; Munich; Dec. 1, 2015.
English translation of JP2010100179A; retrieved from EPO Global Dossier: https://register.epo.org/ on Dec. 9, 2015.
English abstract of DE102007000672A1; retrieved from http://worldwide.espacenet.com/ on Dec. 4, 2015.

* cited by examiner

HYBRID VEHICLE DRIVETRAIN

CROSS-REFERENCE

The present application claims priority to U.S. Provisional Patent Application No. 61/541,513, filed Sep. 30, 2011, the entirety of which is incorporated herein by reference.

TECHNICAL FIELD

The present invention relates to drivetrains for hybrid vehicles.

BACKGROUND

Hybrid vehicles are typically powered by both an internal combustion engine (ICE) and an electric motor. Hybrid vehicles provide a longer operating range than purely electric vehicles while emitting fewer pollutants than purely ICE powered vehicles.

In what is commonly known as a series hybrid vehicle, the ICE is used to turn a generator. The generator produces electricity that is used to power the electric motor or charge the batteries. The electric motor drives the transmission, which in turn drives the wheels. As such, in a series hybrid vehicle, the ICE is only used to produce electricity.

Another type of hybrid vehicle is what is commonly known as a parallel hybrid vehicle. Typically, in this type of hybrid vehicle, both the ICE and the electric motor drive the transmission, which in turn drives the wheels. Depending on the operating condition, only the electric motor can drive the transmission, only the ICE can drive the transmission, or both the ICE and the electric motor can drive the transmission together.

A majority of hybrid vehicles being manufactured are automobiles. However, the advantages of a hybrid propulsion system described above would also apply to vehicles such as motorcycles and three-wheel straddle-type vehicles. These vehicles typically use what is known as a sequential transmission. In such a transmission the various shift positions, also known as gears, are selected in sequence. Thus, in order to get to the third gear from the first gear, the second gear has to be selected before selecting the third gear. This eliminates shifting mistakes that could occur with an automotive manual transmission. The shifter arrangement is also simplified since the driver only has to select between a gear up and a gear down position rather than moving a stick through an H pattern typical of manual transmission. The shifter arrangement is also more compact than that of a manual transmission. Due to these advantages, this type of transmission is also being used in racecars and is beginning to appear in high-end cars.

As such it would be advantageous to combine the benefits of a sequential transmission with those of a hybrid propulsion system.

One of the issues associated with combining a sequential transmission with a parallel hybrid propulsion system arises when the transmission is driven by the electric motor only and the ICE then needs to be powered to assist the electric motor. When the transmission is driven by the electric motor only, the transmission, or the portion of the transmission connecting the ICE to the output shaft of the transmission, is in a neutral position such that the input shaft of the transmission to which the ICE is connected does not turn. When the ICE needs to be used to power the transmission, the transmission has to be moved to a shift position corresponding to a current operating speed of the vehicle (i.e. the shift position at which the transmission would be had the vehicle been operating with the ICE). However, due to the sequential nature of the transmission, the transmission needs to go through the lower shift positions (i.e. low gears) before reaching the required shift position. Since there is a large speed difference between the output shaft of the transmission and that of the input shaft, when engaging the first gear following the neutral position, there is a rapid acceleration of the input shaft, which produces noise and puts substantial stress on the transmission. If the speed difference between the output shaft of the transmission and that of the input shaft is too large, then it is possible that the shift position cannot be engaged.

Therefore, there is a need for a sequential transmission that can be used in a hybrid propulsion system for a vehicle and of a drivetrain having such a transmission.

SUMMARY

It is an object of the present invention to ameliorate at least some of the inconveniences present in the prior art.

One aspect of the present invention provides a drivetrain for a hybrid vehicle having at least one ground engaging element, a torque transmission shaft operatively connected to the at least one ground engaging element to drive the ground engaging element, an electric motor operatively connected to the torque transmission shaft, the electric motor selectively driving the torque transmission shaft and being selectively driven by the torque transmission shaft, a transmission having an input shaft and an output shaft, the output shaft being operatively connected to the torque transmission shaft, the output shaft selectively driving the torque transmission shaft and being selectively driven by the torque transmission shaft, and an internal combustion engine operatively connected to the input shaft of the transmission, the engine selectively driving the input shaft and being selectively driven by the input shaft. The transmission has a neutral shift position where substantially no torque is transferred between the input shaft and the output shaft, a first shift position where torque is transferred between the input shaft and the output shaft by a first set of gears, in the first shift position a ratio of a speed of rotation of the input shaft to a speed of rotation of the output shaft is a highest ratio provided by the transmission, and at least one higher shift position including a highest shift position where torque is transferred between the input shaft and the output shaft by at least one other set of gears, in the highest shift position the ratio of the speed of rotation of the input shaft to the speed of rotation of the output shaft is the lowest ratio provided by the transmission. The transmission is capable of shifting directly from the neutral shift position to the first shift position and directly from the neutral shift position to the highest shift position.

In a further aspect, the transmission has a shift drum having at least one groove. The at least one groove is continuous and spans an entire circumference of the shift drum. Rotating the shift drum to a first position shifts the transmission in the neutral shift position. Rotating the shift drum to a second position shifts the transmission in the first shift position. Rotating the shift drum to a third position shifts the transmission in the highest shift position. The shift drum can be rotated directly from the first position to the second position and directly from the first position to the third position.

In an additional aspect, the shift drum has three grooves. Each one of the three grooves is continuous and spans the entire circumference of the shift drum. The at least one higher shift position includes a second shift position, a third shift position, a fourth shift position, a fifth shift position, and a sixth shift position. The sixth shift position is the highest shift position.

In a further aspect, the transmission includes an actuator for shifting the transmission between the neutral, first and at least one higher shift position. A control module is electronically connected to the actuator for controlling an operation of the actuator.

In an additional aspect, a control module is electrically connected to the engine, the transmission and the electric motor. The control module controls an operation of the drivetrain between at least a first mode of operation and a second mode of operation. In the first mode of operation the electric motor drives the torque transmission shaft, the transmission is in the neutral shift position, and the engine is not operating. In the second mode of operation, the engine drives the input shaft, the transmission is in one of the first and at least one higher shift position, the output shaft drives the torque transmission shaft, and the torque transmission shaft drives the electric motor.

In a further aspect, a clutch selectively connects the engine to the input shaft. The control module is electrically connected to the clutch. In the first mode of operation, the clutch is opened and in the second mode of operation, the clutch is closed.

In an additional aspect, prior to engaging the second mode of operation from the first mode of operation, the transmission is shifted from the neutral shift position to the highest shift position. As a result the torque transmission shaft drives the input shaft via the output shaft, and the input shaft drives the engine.

In a further aspect, a clutch selectively connects the engine to the input shaft. The control module is electrically connected to the clutch. Prior to engaging the second mode of operation from the first mode of operation, the clutch is closed once or after the transmission is shifted directly from the neutral shift position to the highest shift position.

In an additional aspect, a clutch selectively connects the engine to the input shaft.

In a further aspect, a friction clutch operatively connects the electric motor and the output shaft of the transmission to the torque transmission shaft.

In an additional aspect, the at least one ground engaging element is at least one wheel.

Another aspect of the present invention provides a vehicle having a frame, the above-mentioned drivetrain connected to the frame, at least one other ground engaging element mounted to the frame, and a seat.

In a further aspect, a battery is electrically connected to the electric motor.

In an additional aspect, the battery is located under the engine.

In a further aspect, the internal combustion engine is disposed forwardly of the electric motor.

In an additional aspect, the transmission is disposed longitudinally between the internal combustion engine and the electric motor.

In a further aspect, the seat is a straddle seat.

In an additional aspect, the at least one ground engaging element is a rear wheel and the at least one other ground engaging element is two front wheels.

Yet another aspect of the present invention provides a method of starting an internal combustion engine in a hybrid vehicle. The vehicle has the engine, an electric motor and a transmission. The method comprises: driving an output shaft of the transmission with the electric motor; shifting the transmission directly from a neutral shift position to a highest shift position; driving the engine with an input shaft of the transmission once or after the transmission is shifted directly from the neutral shift position to the highest shift position; and starting the engine once the engine is driven by the input shaft.

In a further aspect, the method further comprises downshifting the transmission to a lower shift position once the transmission is shifted directly from the neutral shift position to the highest shift position. Driving the engine with an input shaft of the transmission once or after the transmission is shifted directly from the neutral shift position to the highest shift position includes driving the engine with the input shaft of the transmission once the transmission is in the lower shift position.

In an additional aspect, driving the engine with an input shaft of the transmission once or after the transmission is shifted directly from the neutral shift position to the highest shift position includes closing a clutch selectively connecting the engine to the input shaft once or after the transmission is shifted directly from the neutral shift position to the highest shift position.

Another aspect of the invention provides another method of starting an internal combustion engine in a hybrid vehicle. The vehicle has an engine, the electric motor and a transmission. The method comprises: driving an output shaft of the transmission with the electric motor; initiating rotation of a crankshaft of the engine using a starter motor; shifting the transmission directly from a neutral shift position to a highest shift position after initiating rotation of the crankshaft using the starter motor; and driving the engine with an input shaft of the transmission once or after the transmission is shifted directly from the neutral shift position to the highest shift position.

In a further aspect, the method further comprises downshifting the transmission to a lower shift position once the transmission is shifted directly from the neutral shift position to the highest shift position. Driving the engine with an input shaft of the transmission once or after the transmission is shifted directly from the neutral shift position to the highest shift position includes driving the engine with the input shaft of the transmission once the transmission is in the lower shift position.

In an additional aspect, driving the engine with an input shaft of the transmission once or after the transmission is shifted directly from the neutral shift position to the highest shift position includes closing a clutch selectively connecting the engine to the input shaft once or after the transmission is shifted directly from the neutral shift position to the highest shift position.

For purposes of this application terms related to spatial orientation such as forwardly, rearwardly, left, and right, are as they would normally be understood by a driver of the vehicle sitting thereon in a normal driving position.

Example embodiments of the present have at least one of the above-mentioned aspects, but do not necessarily have all of them. It should be understood that example embodiments of the present may have other aspects not specifically recited herein.

Additional and/or alternative features, aspects, and advantages of embodiments of the vehicle transmission will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with respect to a three-wheeled vehicle having a handlebar for steering. However it should be understood that aspects of the invention could be used in other wheeled vehicles such as, but not limited to, a motorcycle, a scooter, and an all-terrain vehicle (ATV). U.S. Pat. No. 6,732,830, issued May 11, 2004, the entirety of which is incorporated herein by reference, describes the general features of an ATV.

Figure 1:
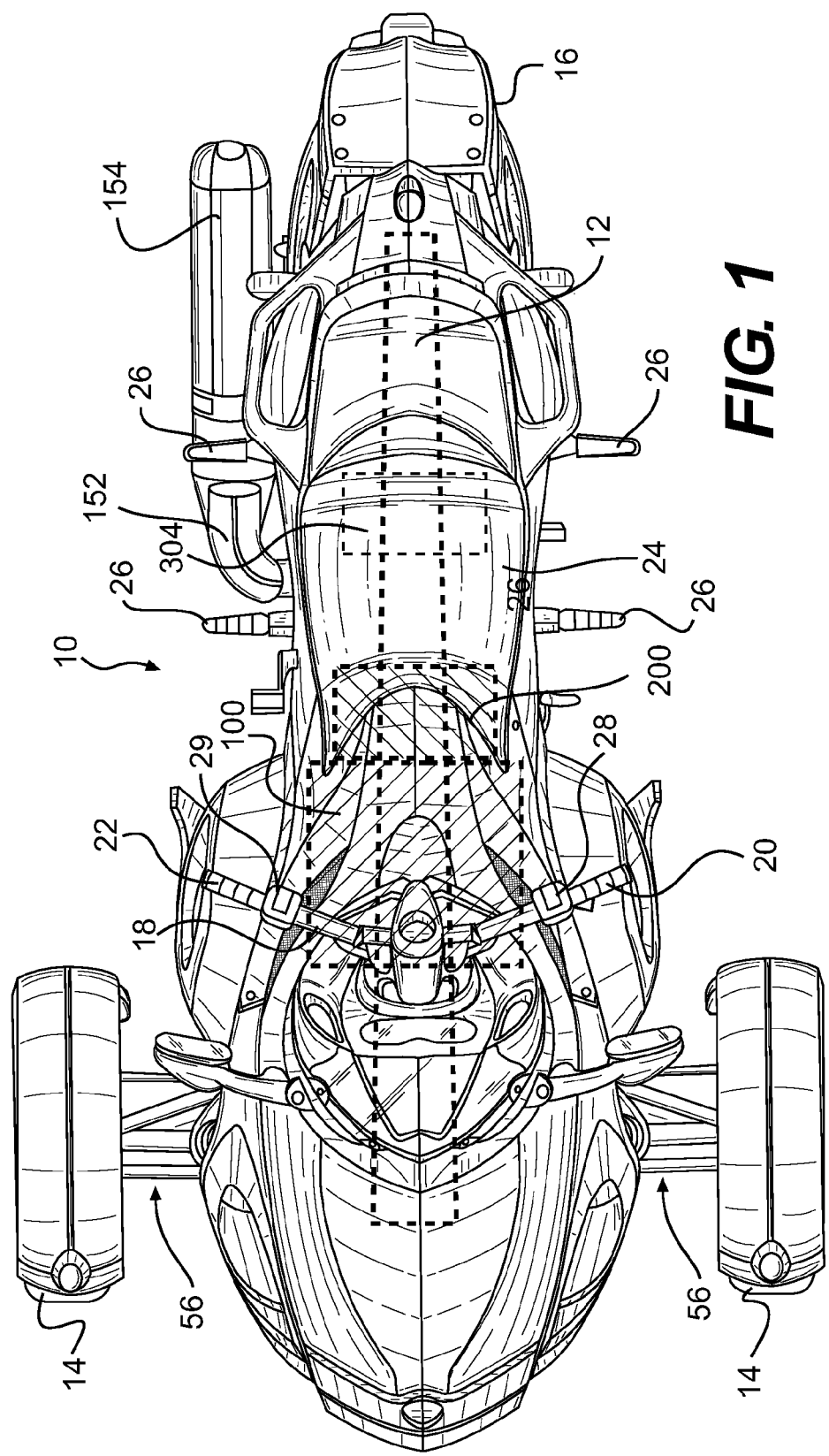
FIG. 1 is a top plan view of a three-wheel vehicle.

Referring to FIG. 1, a three-wheeled vehicle 10 has a frame 12 (shown schematically in this figure) to which two front wheels 14 and one rear wheel 16 are connected. A handlebar 18 is connected to the two front wheels 14 for steering the two front wheels 14. The handlebar 18 has a left handle 20 and a right handle 22 disposed at ends of the handlebar 18. A throttle operator (not shown), in the form of a twist grip or lever, is provided on the right handle 22 to allow the driver to control a speed and acceleration of the vehicle 10. The handlebar 18 is disposed forwardly of a straddle seat 24 that is supported by the frame 12. An internal combustion engine 100, a transmission 200 and an electric motor 300 (shown schematically in FIG. 2) are disposed on the frame 12 as will be described in greater detail below. Footrests 26 are mounted on the left and right sides of the vehicle 10 below the straddle seat 24. A drive selector switch 28 is mounted on the left side of the handlebar 18, to be operated by the left hand of the driver. The drive selector switch 28 is used to select if the vehicle 10 is to be driven forward, rearward or be in neutral. The shift position (i.e. first gear, second gear . . . ) of the transmission 200 is automatically selected and changed by a transmission control module (TCM) based on the selection made with the switch 28 and other operating conditions of the vehicle 10 such as vehicle speed and throttle operator position. It is contemplated that the drive selector switch 28 could alternatively be a finger-operated button, a hand actuated lever, a foot actuated pedal or any other suitable type of selector. It is contemplated that the drive selector switch 28 could be used by the user to select a shift position of the transmission 200. An operation mode selector switch 29 is mounted on the right side of the handlebar 18, to be operated by the right hand of the driver. The operation mode selector switch 29 is used by the driver to select a mode of operation of the vehicle such as the ELECTRIC mode, ECO mode, CHARGE mode, and SPORT mode described below. It is contemplated that the switches 28 and 29 could be positioned elsewhere on the vehicle 10.

The three-wheel vehicle 10 has other features well known in the art such as a vehicle body, rear view mirrors, lights and mudguards. For simplicity, these features will not be described in detail herein.

Figure 2:
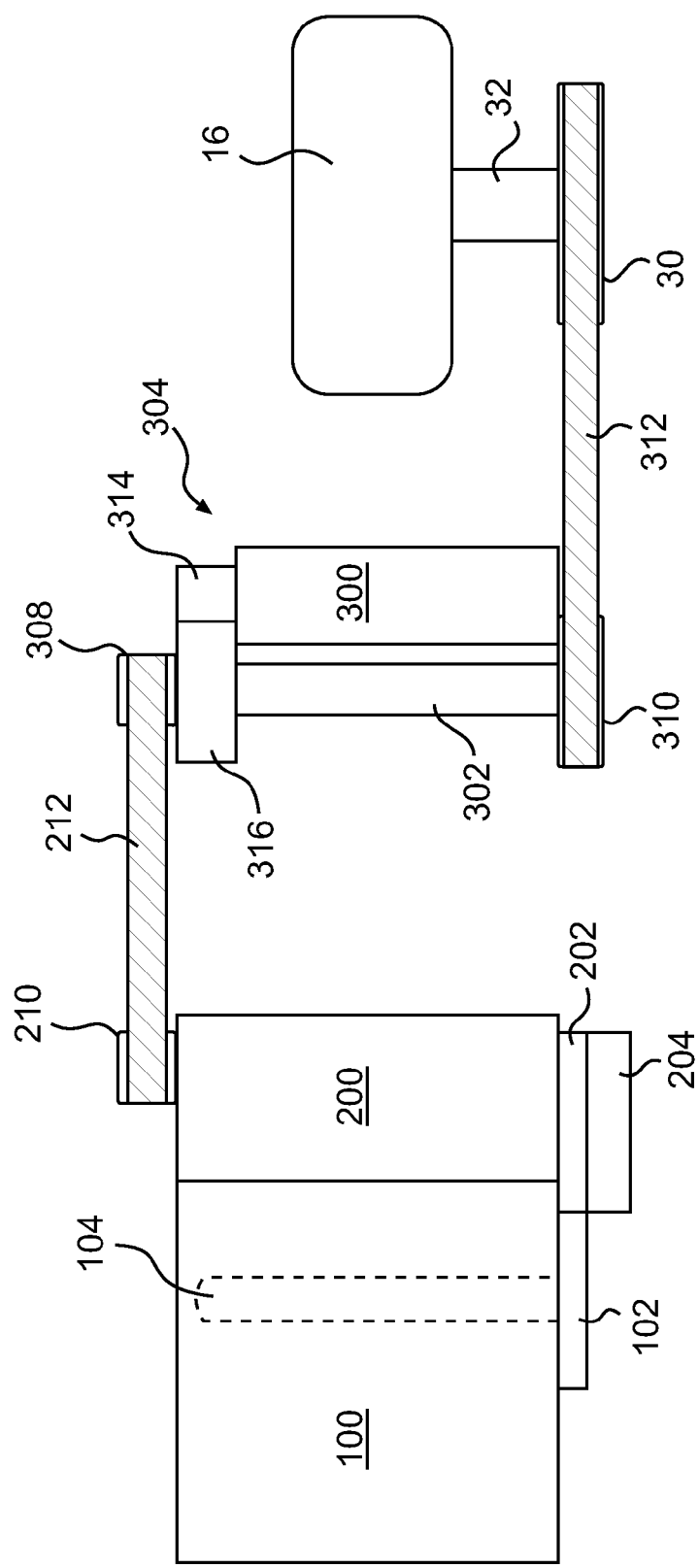
FIG. 2 is a schematic top view of a drivetrain of the three-wheel vehicle of FIG. 1.

Turning now to FIG. 2, a drivetrain of the three-wheel vehicle 10 will be described. The drivetrain includes the engine 100, the transmission 200, the electric motor 300 and a torque transmission shaft 302. The engine 100 is a four-stroke, two-cylinder inline internal combustion engine. The engine 100 will be described in greater detail below. The transmission 200 is mounted to the engine 100. The transmission 200 is an automated six-speed electrohydraulic sequential transmission. It is contemplated that the transmission 200 could have more or fewer speeds. The transmission 200 will be described in greater detail below. The torque transmission shaft 302 and the electric motor 300 form an assembly 304 (see FIGS. 22 to 24) that is disposed rearwardly of the engine 100 and transmission 200. The electric motor 300 is a synchronous AC electric motor. It is contemplated that other types of electric motors could be used. The electric motor 300 is powered by a high voltage battery 306. In one embodiment, the battery 306 has a voltage of 374 volts. In other embodiments, the voltage of the battery 306 is between 168 and 252 volts. Other voltages are contemplated. The battery 306 is provided with a cooling system (not shown) to prevent overheating of the battery 306. The assembly 304 formed by the electric motor 300 and the torque transmission shaft 302 will be described in greater detail below.

The engine 100 selectively drives the transmission 200 via a drive gear 102 disposed on a left end of a crankshaft 104 of the engine 100. The drive gear 102 engages a clutch drive gear 202 of a clutch 204 that is mounted on an input shaft 206 (FIG. 10) of the transmission 200. The clutch 204 is a normally opened electrohydraulic automatic clutch. The input shaft 206 selectively transmits torque to an output shaft 208 (FIG. 10) of the transmission 200, and vice versa, via gears as will be described in greater detail below. A dampened belt sprocket 210 is disposed on a right end of the output shaft 208. The dampened belt sprocket 210 is of the type described in United States Patent Publication No. US2008/0283322 A1, published Nov. 20, 2008, the entirety of which is incorporated herein by reference. It is contemplated that other types of dampened or undampened belt sprockets could be used. A toothed belt 212 is disposed around the belt sprocket 210 and a belt sprocket 308 disposed on a right end of the torque transmission shaft 302. The belt 212 transmits torque from the output shaft 208 of the transmission 200 to the torque transmission shaft 302, and vice versa. Another belt sprocket 310 is disposed on a left end of the torque transmission shaft 302. The belt sprockets 308 and 310 are undampened, but it is contemplated that they could be. A toothed belt 312 is disposed around the belt sprocket 310 and a dampened belt sprocket 30 disposed on a left end of a wheel shaft 32 of the rear wheel 16 to drive the rear wheel 16. The belt sprocket is also of the type described in United States Patent Publication No. US2008/0283322 A1, but it is contemplated that other types of dampened or undampened belt sprockets could be used. It is contemplated that the toothed belt 212 and/or the toothed belt 312 could be replaced by a chain, in which case the corresponding belt sprockets 210, 308, 310, 30 would be replaced by chain sprockets.

The electric motor 300 drives the torque transmission shaft 302 via gears 314 and 316. The gear 314 is disposed on a right end of a shaft 318 (FIG. 24) of the electric motor 300. The gear 316 is disposed on a right side of the torque transmission shaft 302, laterally inwardly of the belt sprocket 308. Torque from the electric motor 300 is then transmitted to the rear wheel 16 by the belt sprockets 310 and 30 and the belt 312 as described above. As will be described in greater detail below, under certain operating conditions, it is the torque transmission shaft 302 that drives the electric motor 300 via the gears 314, 316. Under such operating conditions, the electric motor 300 generates electricity thereby recharging the battery 306.

As will be explained in greater detail below, the rear wheel 16 can be driven by the electric motor 300 only, by the internal combustion engine 100 only, or by both the electric motor 300 and the internal combustion engine 100.

It is contemplated that at least one of the wheels 14, 16 could be provided with a regenerative braking system that generates electricity to recharge the battery 306 when the brakes are applied.

Figure 3:
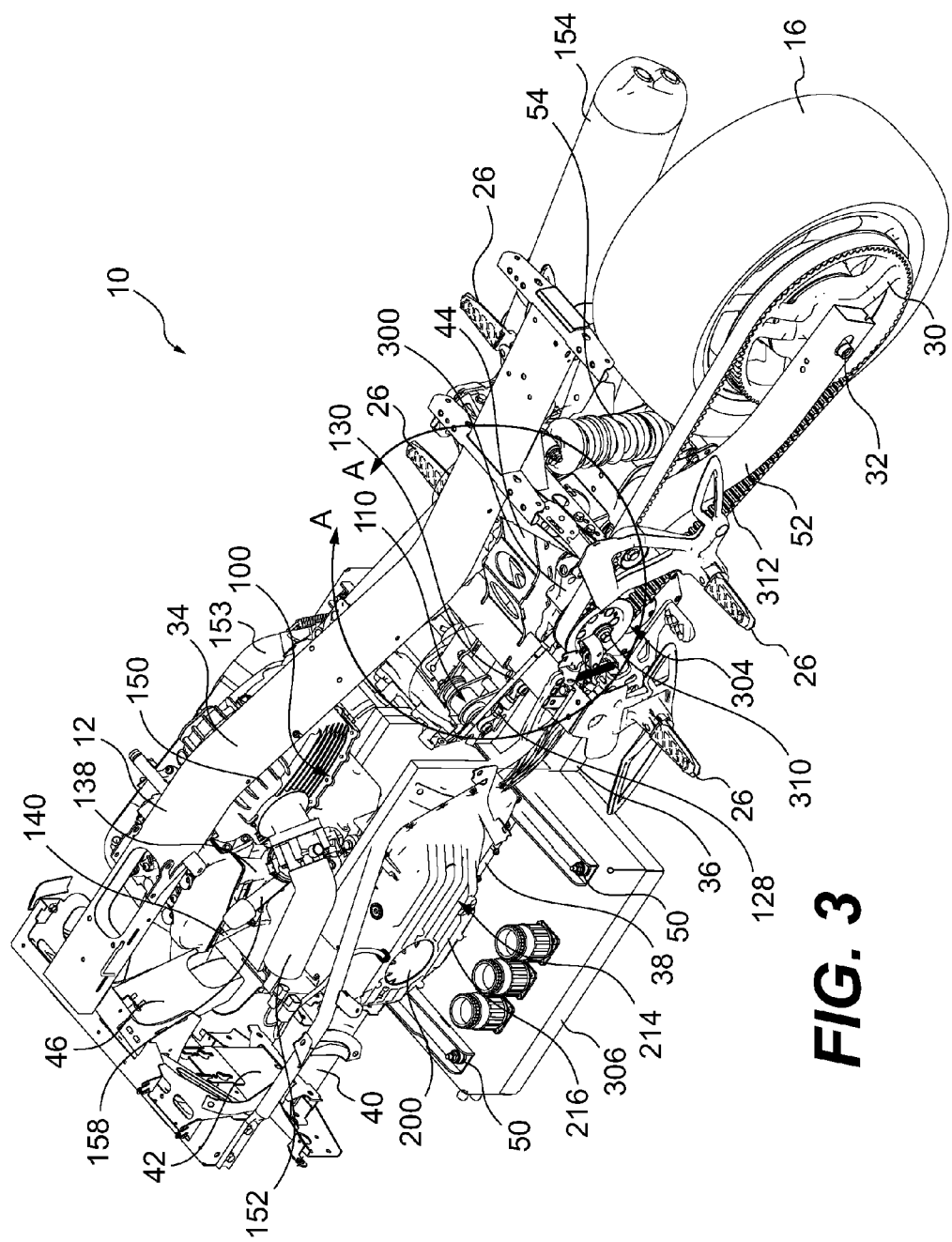
FIG. 3 is perspective view taken from a rear, left side of a frame of the three-wheel vehicle of FIG. 1 and of some of the components connected thereto.
Figure 4:
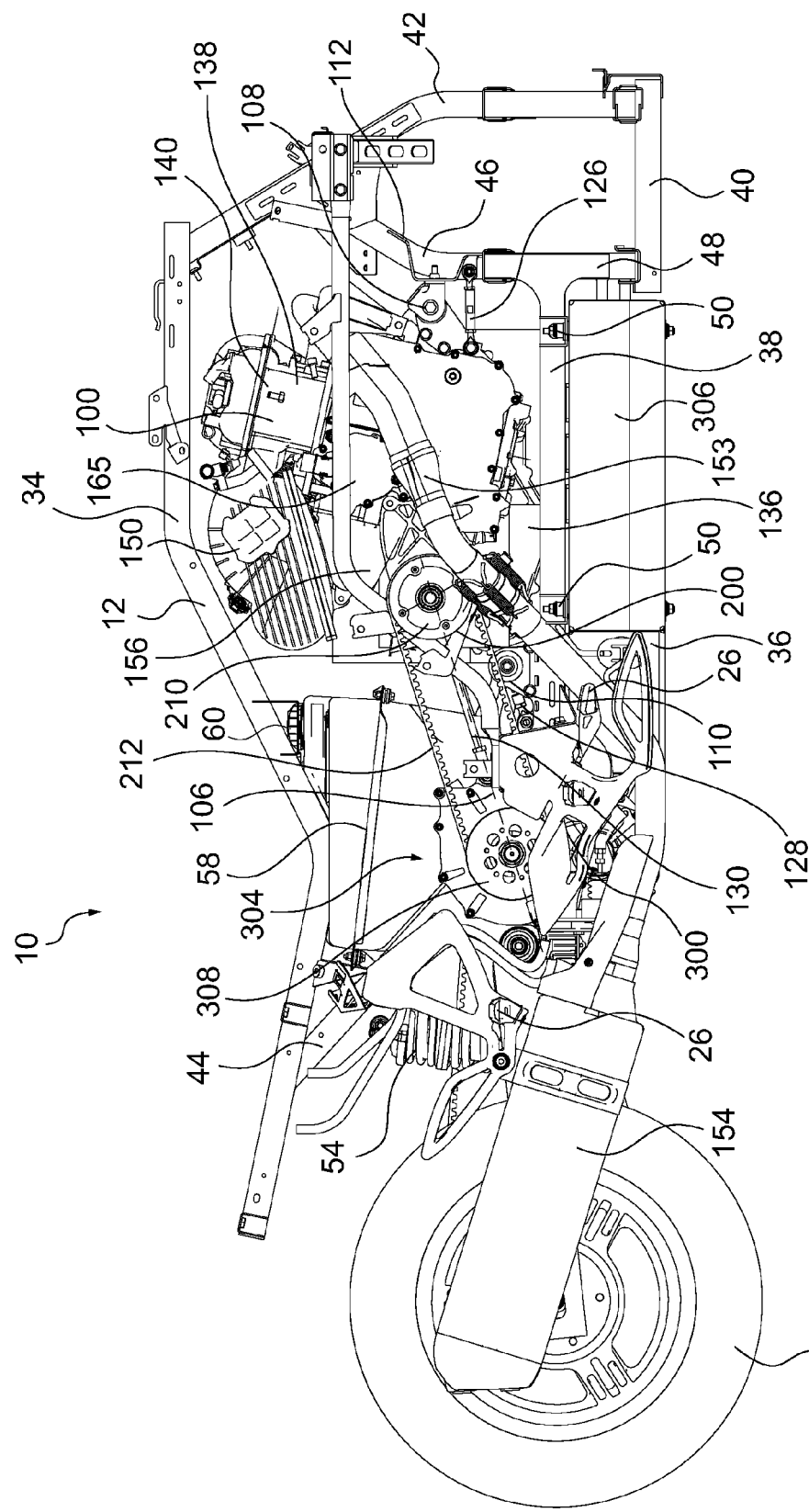
FIG. 4 is a right side elevation view of the frame of the three-wheel vehicle of FIG. 1 and of some of the components connected thereto.

Turning now to FIGS. 3 and 4, the frame 12 and the arrangement of the drivetrain and other components of the vehicle 10 on the frame 12 will be described in more details.

The frame 12 is similar to the frame described in International Patent Publication No. WO2007/130015 A1, published on Nov. 15, 2007, the entirety of which is incorporated herein by reference. The main difference between the frame 12 and the frame of the above-recited International Patent Publication is the presence of a recess formed in the lower portion of the frame 12 to receive the battery 306, as will be described below.

The frame 12 has an upper frame member 34, a rear lower frame member 36, a center lower frame member 38 and a front lower frame member 40 which are interconnected with each other, thus forming a closed perimeter with a space therein. A forward cross member 42 interconnects a forward portion of the upper frame member 34 with a forward portion of the front lower frame member 40. A rearward cross member 44 interconnects a rearward portion of the upper frame member 34 with a rearward portion of the rear lower frame member 36. A strut 46 extends from the forward cross member 42 to the forward portion of the center lower frame member 38. The center lower frame member 38 is raised relative to the rear and front lower frame members 36 and 40. The center lower frame member 38 has a front leg 48 connecting a front portion thereof to a rearward portion of the front lower frame member 40. The center lower frame member 38 also has a rear leg (not shown) connecting a rear portion thereof to a forward portion of the rear lower frame member 40. The raised center lower frame member 38 creates a space to receive the battery 306. The battery 306 is fastened to brackets 50 extending laterally outwardly from the center lower frame member 38. As can be seen in FIG. 4, a bottom surface of the battery 306 is substantially leveled with the bottom surfaces of the rear and front lower frame members 36 and 40. However it is contemplated that the bottom surface of the battery 306 could be higher or lower than the bottom surfaces of the rear and front lower frame members 36 and 40 depending on the position of the center lower frame member 38 relative to the two other lower frame members 36 or 40. It is also contemplated that the battery 306 could be mounted above one of the lower frame members 36, 38 and 40. In such an embodiment, the lower frame members 36, 38 and 40 could be replaced by a single straight lower frame member. It is contemplated that the battery 306 could be located elsewhere on the frame or the vehicle 10 depending on the arrangement of the other components of the vehicle 10.

The upper frame member 34, rear lower frame member 36, center lower frame member 38, front lower frame member 40, forward cross member 42, rearward cross member 44 and strut 46 are made of metallic tubular beams having similarly sized rectangular cross-sections. However it is contemplated that the members 34, 36, 38, 40, 42 and 44 and strut 46 could have different cross-sectional dimensions, could be made of non-metallic material (composite materials for example), and could also have a different configuration (I-beams or C-channels for example). The rear lower frame member 36 and the rearward cross member 44 are integrally formed as a single beam that is bent. It is also contemplated that these members 36, 44 could be welded to each other. The rearward cross member 44 extends rearwardly and upwardly from the rear lower frame member 36 and is welded to the upper frame member 34. The upper and lower ends of the forward cross member 42 are welded to the upper frame member 34 and to the front lower frame member 40 respectively. The center lower frame member 38 is welded to the rear and front lower frame members 36, 40. It is contemplated that the members 34, 36, 38, 40, 42 and 44 may be joined by other means. For example, they may be joined by using brackets and fasteners. It is also contemplated that the members 34, 36, 38, 40, 42 and 44 could be made of a single beam, which could be bent to obtain a closed perimeter. The above-described frame 12 is only one contemplated frame for the vehicle 10. It is contemplated that other frames could be used. The frame 12 has a number of other features and brackets, some of which will be described in greater detail below.

The rear wheel 16 is mounted to the frame 12 via a swing arm 52. The length of the swing arm 52 is selected such that at least a portion of the rear wheel 16 is disposed below the rear portion of the upper frame member 34, but it is contemplated that a longer swing arm could be used. A shock absorber unit 54 is mounted to the swing arm 52 at one end and to the rearward cross member 44 at the other, so as to be disposed along a longitudinal centerline of the vehicle 10. The shock absorber unit 54 consists of a hydraulic shock absorber with a coil spring disposed around the shock absorber. The front wheels 14 are mounted to the frame 12 via double A-arm suspension 56 (FIG. 1) operatively connecting the wheels 14 to the forward cross member 42 and the strut 46. It is contemplated that different types of suspensions could be used to mount the wheels 14, 16 to the frame 12.

A fuel tank 58, shown in FIG. 4, is mounted to the frame 12 via brackets. The fuel tank 58 holds the fuel used by the engine 100 to operate. As can be seen, the fuel tank 58 is disposed rearwardly of the internal combustion engine 100, vertically above the assembly 304, and between the upper frame member 34 and the rearward cross member 44. In this position, the fuel tank 58 is disposed under the seat 24. The fuel tank 58 can be filled by removing a cap 60 that can be accessed by pivoting or removing the seat 24.

The assembly 304 formed by the torque transmission shaft 302 and the electric motor 300 is disposed rearwardly of the internal combustion engine 304 and is located under the rearward cross member 44. The assembly 304 defines a channel 320 (see FIGS. 22 and 23) that receives a portion of the rearward cross member 44. Threaded fasteners 322 extend through the channel 320 and the portion of the rearward cross member 44 to rigidly mount the assembly under the rearward cross member 44. It is contemplated that the connection between the assembly 304 and the rearward cross member 44 could be provided with dampening means, such as, for example, elastomeric bushings around the fasteners 322, to reduce the transmission of vibrations between the assembly 304 and the rearward cross member 44. The assembly 304 is located along the rearward cross member 44 such that an axis of rotation of the belt sprocket 310 is in proximity to an axis of rotation of the swing arm 52 relative to the frame 12. In an alternative embodiment, the axis of rotation of the belt sprocket 310 and the axis of rotation of the swing arm 52 relative to the frame 12 are coaxial.

Figure 6:
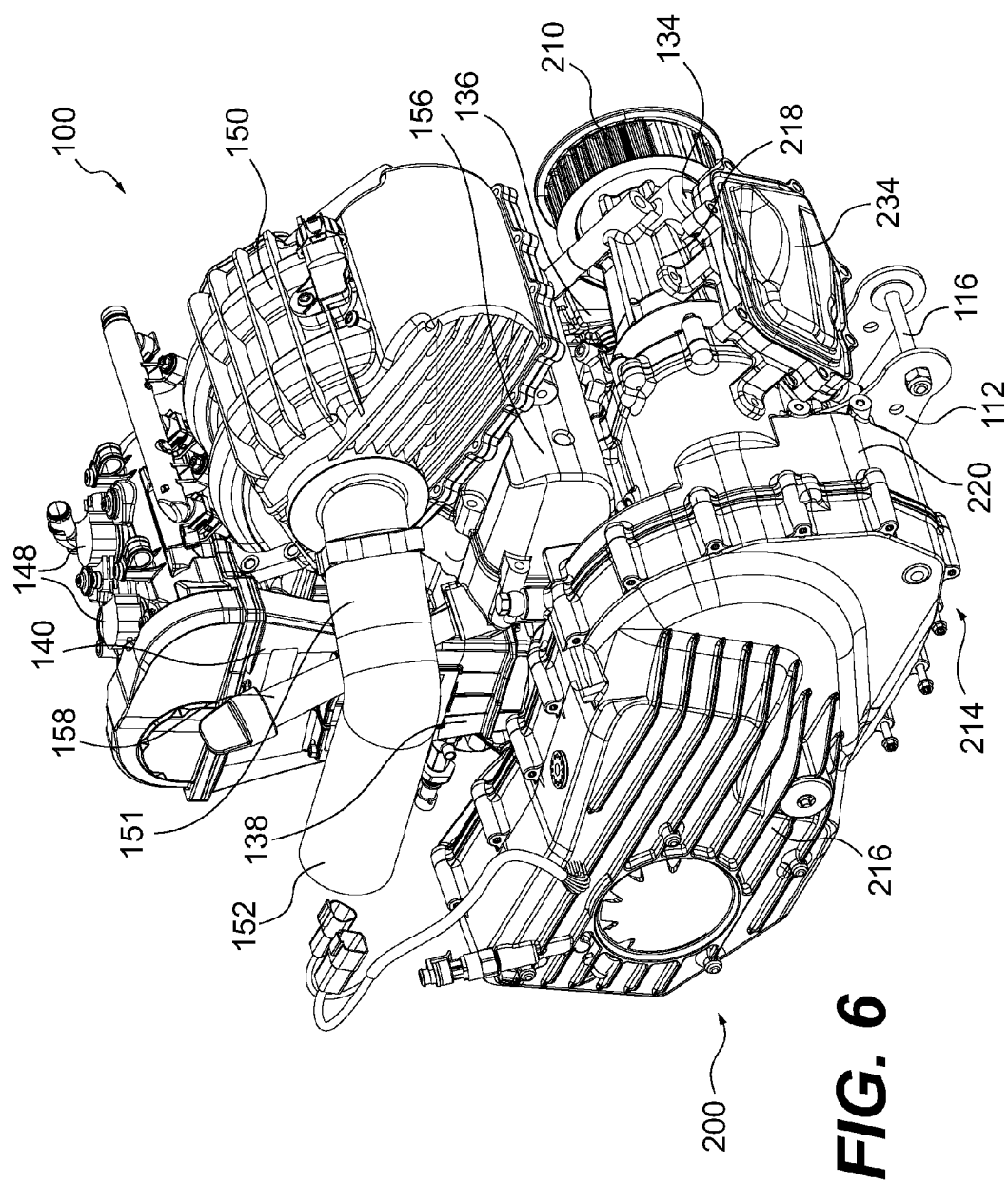
FIG. 6 is a perspective view taken from a rear, left side of the engine and the transmission of FIG. 5.
Figure 7:
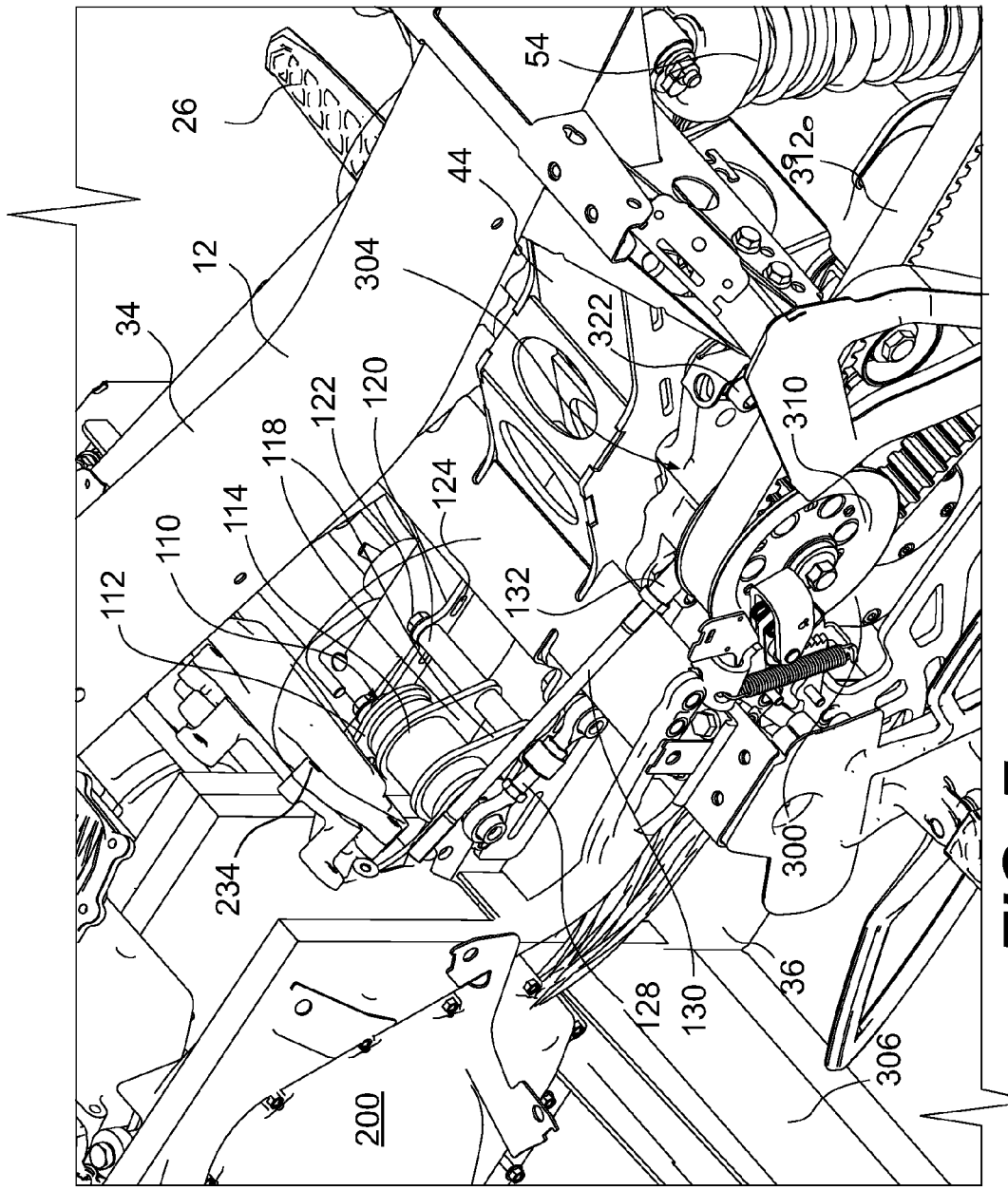
FIG. 7 is a close-up view of portion A-A in FIG. 3.

The internal combustion engine 100 and the transmission 200 are mounted as a unit over the center lower frame member 38, above the battery 306. Due to the orientation of the engine 100 and the type of crankshaft 104 being used, as will be discussed below, the engine 100 generates the least vibrations in the direction parallel to the axis 106 (FIG. 4) passing through the centers of the sprockets 210 and 308. To reduce the transmission of vibrations to the frame 12, the engine 100 and transmission 200 are connected to the frame via two front rubber dampers 108 (only one of which is shown in FIG. 4) and one rear rubber damper 110 (FIG. 7). The front rubber dampers 108 are disposed on either side of the front on the engine 100. As can be seen in FIG. 4, the front rubber dampers 108 connect the engine 100 to brackets 112 connected to the strut 46. As can be seen in FIG. 6, a lateral centerline of the engine 100 passes through a bracket 112 extending rearwardly from the transmission 200 to which the rear rubber damper 110 is connected. As seen in FIG. 7, the rear rubber damper 110 consists of a metal cylinder 114 disposed around a rubber cylinder (not shown) enclosing a fastener 116 connected to the bracket 112. Two flanges 118 are disposed around the metal cylinder 114 and extend rearwardly and downwardly therefrom. The lower ends of the flanges 118 connect to a tube 120. A fastener 122 passes through the tube 120 to connect the tube 120, and therefore the rear rubber damper 110, to a bracket 124 connected to the center lower frame member 38. It is contemplated that the flanges 118 could be welded, or otherwise connected, to the lower frame member 38.

In order to prevent movement of the engine 100 and transmission 200 toward the rear of the vehicle, which would cause the belt 212 to lose tension, various elements are provided to restrain such motion. A rod 126 (FIG. 4) having ball joint ends is connected between the front of the engine 100 and the strut 46. The rod 126 extends generally horizontally. Another rod 128 (FIG. 7) having ball joint ends has one end connected to the fastener 166 of the rear rubber damper 110 and another end connected to the bracket 124. Rods 130 (FIG. 23) have one end connected to the assembly 304. The rods 130 are connected to the assembly via ball joints 132. The rods extend from the assembly 304 toward the engine 100 and transmission. The ends of the rods 130 opposite the ends having the ball joints 132 are slidably received inside recesses 134 (one of which is shown in FIG. 6) in the transmission 200. As such, the rods 130 prevent the engine 100 and transmission 200, and therefore the belt sprocket 210 to move toward the belt sprocket 308, which would cause the belt 212 to lose tension, but permit the engine 100 and transmission 200 to move away from the belt sprocket 308. It is contemplated that the rods 130 could be connected to the engine 100 or the transmission 200 via the ball joints 132 at one end and have their other ends received in recesses in the assembly 304. It is contemplated that one or more of the rods 126, 128 and 130 could be omitted.

Figure 5:
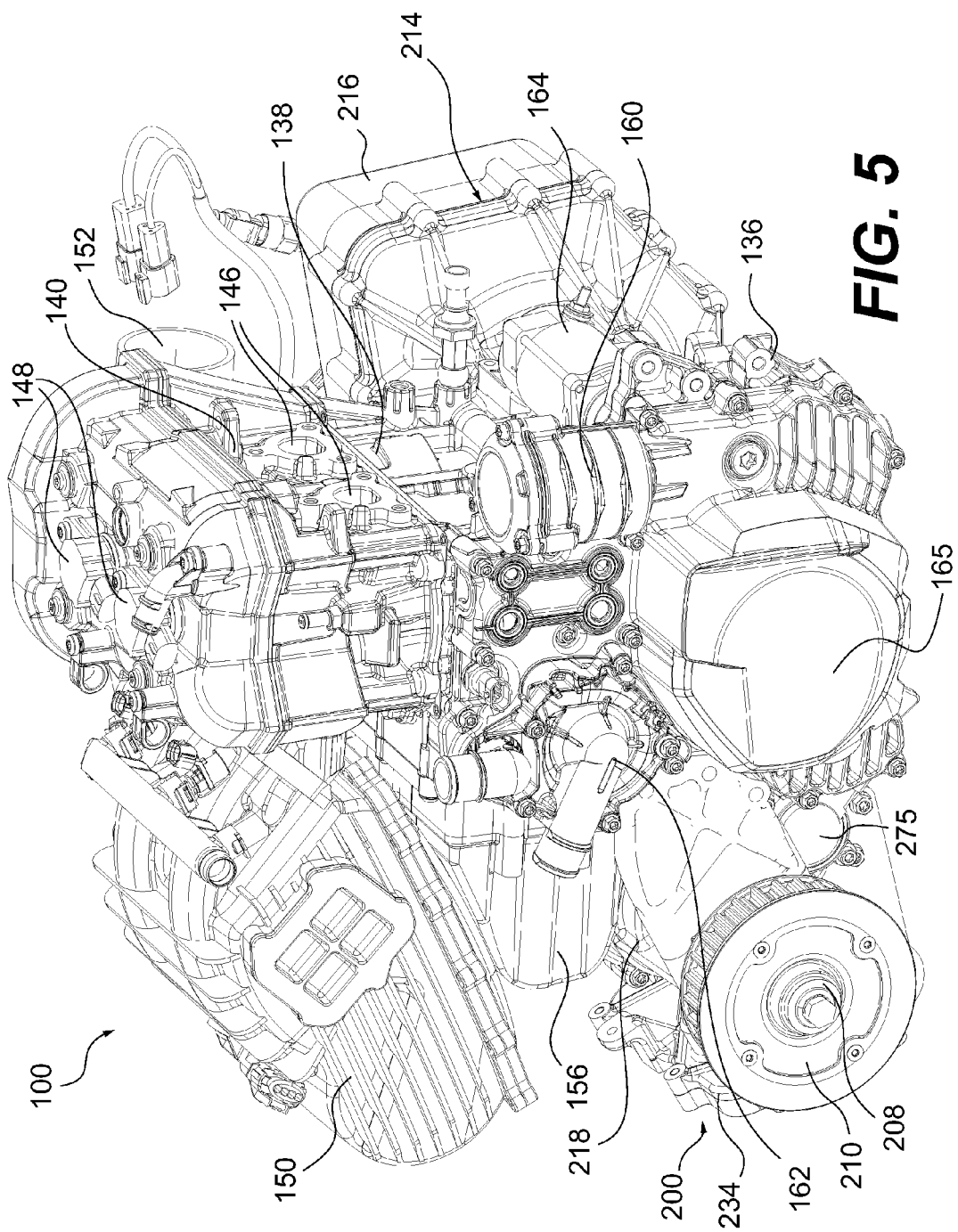
FIG. 5 is a perspective view taken from a front, right side of an engine and a transmission of the three-wheel vehicle of FIG. 1.
Figure 8:
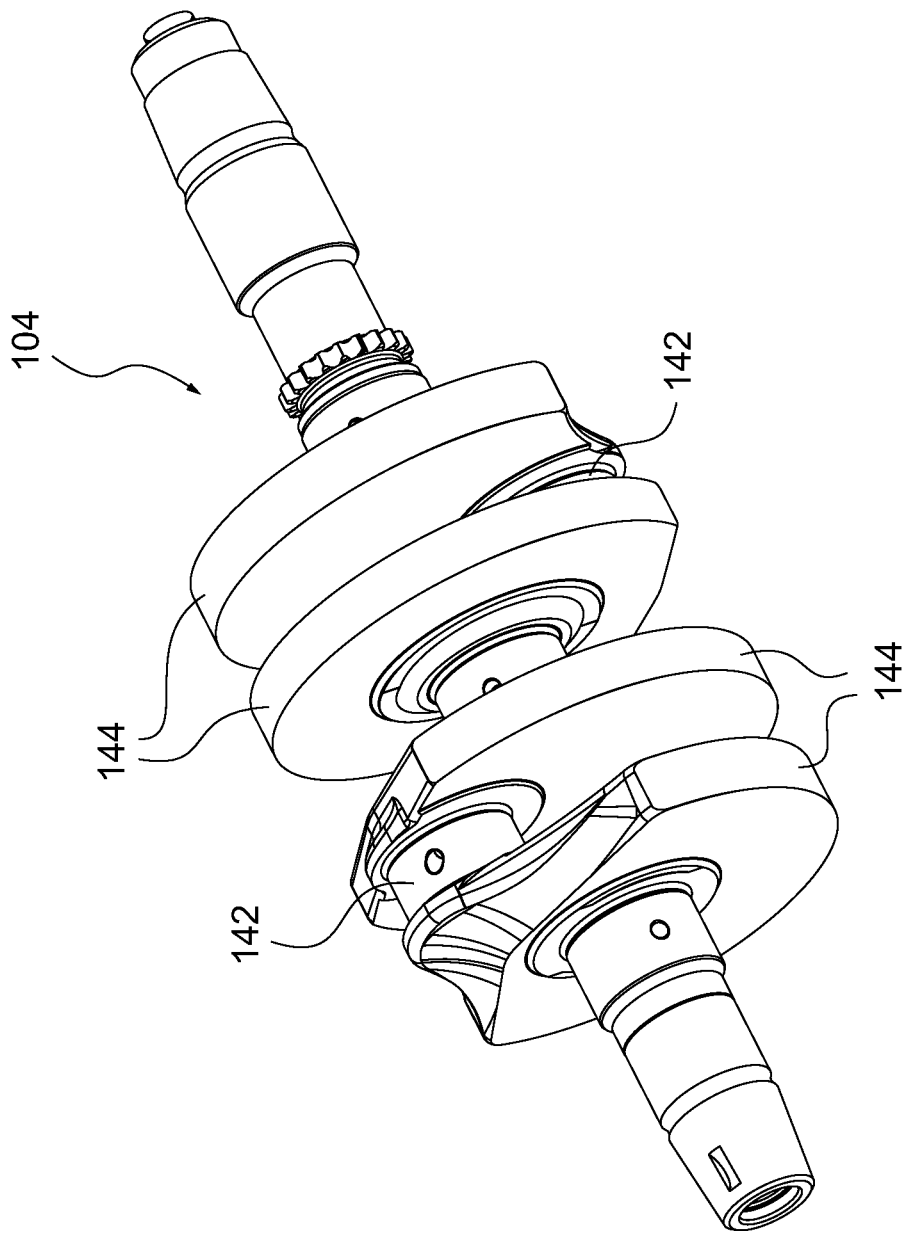
FIG. 8 a perspective view taken from a front, right side of a crankshaft of the engine of FIG. 5.

Turning now to FIGS. 5 and 6, the internal combustion engine 100 will be described in more detail. The engine 100 has a crankcase 136, a cylinder block 138 above the crankcase 136, and a cylinder head 140 above the cylinder block 138. The crankshaft 104 extends laterally and is supported by bearings (not shown) in the crankcase 136 for rotation therein. The cylinder block 138 defines two cylinders (not shown) disposed laterally next to each other. Pistons (not shown) are received inside the cylinders for reciprocation therein. The pistons are connected via connecting rods (not shown) to crank pins 142 (FIG. 8) of the crankshaft 104. Two webs 144 (FIG. 8) are disposed on either sides of each crank pin 142. The webs 144 are almost circular and each pair of webs 144 is symmetric to the other pair of webs 144 about the axis of rotation of the crankshaft 104, thus greatly reducing vibrations produced by the rotation of the crankshaft 104. The pistons, cylinders and cylinder head 140 form two variable volume combustion chambers (not shown).

Two air intake ports (not shown) supply air and fuel inside the combustion chambers. Air is supplied to the air intake ports by an air intake system consisting of a hose 152, a throttle body 151 controlling the flow of air to the air intake ports, an air box/intake manifold 150, and an air filter. Fuel is supplied from the fuel tank 58 to the air intake ports by a fuel supply system (not shown). The fuel supply system includes at least one fuel pump, hoses, and two fuel injectors. Two spark plugs 148 inserted in the cylinder head 140 ignite the air/fuel mixture in the cylinders. The exhaust gases generated by the combustion of the air/fuel mixture exit the cylinders by two exhaust ports 146. From the exhaust ports 146, the exhaust gases flow in an exhaust manifold (not shown) mounted on the front of the cylinder block 138. From the exhaust manifold, the exhaust gases flow inside pipes 153 that, as can be seen in FIGS. 3 and 4, extend forwardly, then laterally toward the right across the front of the engine 100, then rearwardly and downwardly along a right side of the engine 100 and to a muffler 154. The muffler 154 is disposed at the rear of the vehicle 10 to the right of the rear wheel 16. Fluid communications between the intake ports, the exhaust ports 146 and the combustion chambers are controlled by intake and exhaust valves (not shown) respectively. The intake and exhaust valves are actuated by a camshaft system (not shown).

Returning to FIGS. 5 and 6, oil for lubricating the engine 100 is stored in an oil tank formed between the back walls of the crankcase 136 and of the cylinder block 138 and an oil tank cover 156. The cover 156 is fastened to the back walls of the crankcase 136 and of the cylinder block 138 and is disposed below the air box/intake manifold 150. The oil tank can be filled via an oil filler neck 158. Oil is supplied to the various components of the engine 100 via an oil pump (not shown) driven by the crankshaft 104 and is filtered by an oil filter 160. The engine 100 is cooled by water pumped from a water reservoir (not shown) by a mechanical pump 162. The pump 162 is also driven by the crankshaft 104.

A starter motor 164 is mounted to the front of the crankcase 138. The starter motor 164 selectively engages the drive gear 102 to cause the initial rotations of the crankshaft 104 necessary to start the engine 100 under certain conditions as will be described below. The starter motor 164 is powered by a 12 volts battery (not shown). This battery also powers the various gauges and displays on the vehicle 10, and the various control units and modules of the vehicle 10. This battery is recharged by the battery 306 or by a 12 Volts generator (not shown, disposed behind cover 165 in FIG. 5) when the engine 100 is operating.

The engine 100 is controlled by an engine control unit (ECU) (not shown). The ECU controls the throttle opening, the fuel injection, and the ignition timing of the engine 100 based on a torque based control strategy. The torque to be generated by the engine 100 is determined by a hybrid control module (HCM) based on various parameters of the vehicle 10 such as, for example, a position of the throttle operator, a speed of the vehicle 10, a speed of the engine 100, a shift position of the transmission 200, and a torque generated by the electric motor 300. The HCM sends a signal representative of this torque to the ECU, which then controls the throttle opening, fuel injection, and ignition timing of the engine 100 to obtain this torque.

Figure 9:
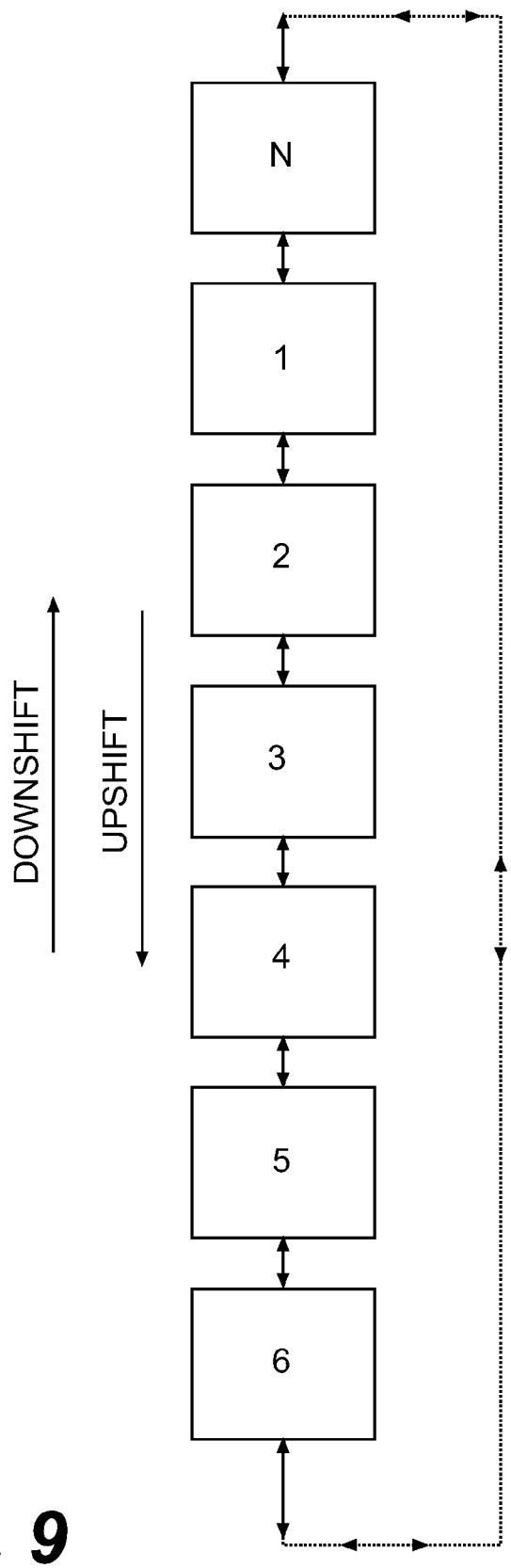
FIG. 9 is a schematic illustration of a shifting sequence for a transmission of the three-wheel vehicle of FIG. 1.

Turning now to FIGS. 9 to 21, the transmission 200 and its associated components will now be described. As illustrated in FIG. 9, the transmission 200 has seven shift positions, which are sequentially: neutral shift position, first shift position, second shift position, third shift position, fourth shift position, fifth shift position, and sixth shift position. The shift positions are engaged sequentially in both the upshift direction and the downshift direction. For a given speed of rotation of the input shaft 206, the output shaft 208 rotates increasingly faster as the transmission positions are changed in the upshift direction. Additionally, for reasons explained below, the transmission 200 can shift directly from the neutral shift position to the sixth shift and vice versa. The transmission 200 does not have a reverse shift position that would allow the engine 100 to cause the vehicle 10 to move in a reverse direction. As will be explained in detail below, to move the vehicle 10 in the reverse direction, the transmission 200 is put in the neutral shift position and the electric motor 300 is turned in a direction causing the torque transmitted to the rear wheel 16 to make the vehicle 10 move in the reverse direction. It is contemplated that the transmission 200 could have more or less than seven shift positions. It is also contemplated that the transmission 200 could have a reverse shift position.

The transmission 200 is mounted to the engine 100 via flanges (not shown). The transmission has a housing 214 (best shown in FIG. 6). The housing 214 includes two side covers 216, 218 that are fastened to a central housing section 220. The housing 214 houses the various gears, shaft and components necessary to shift the transmission 200 into its various shift positions, but also a pumping unit 222.

Figure 10:
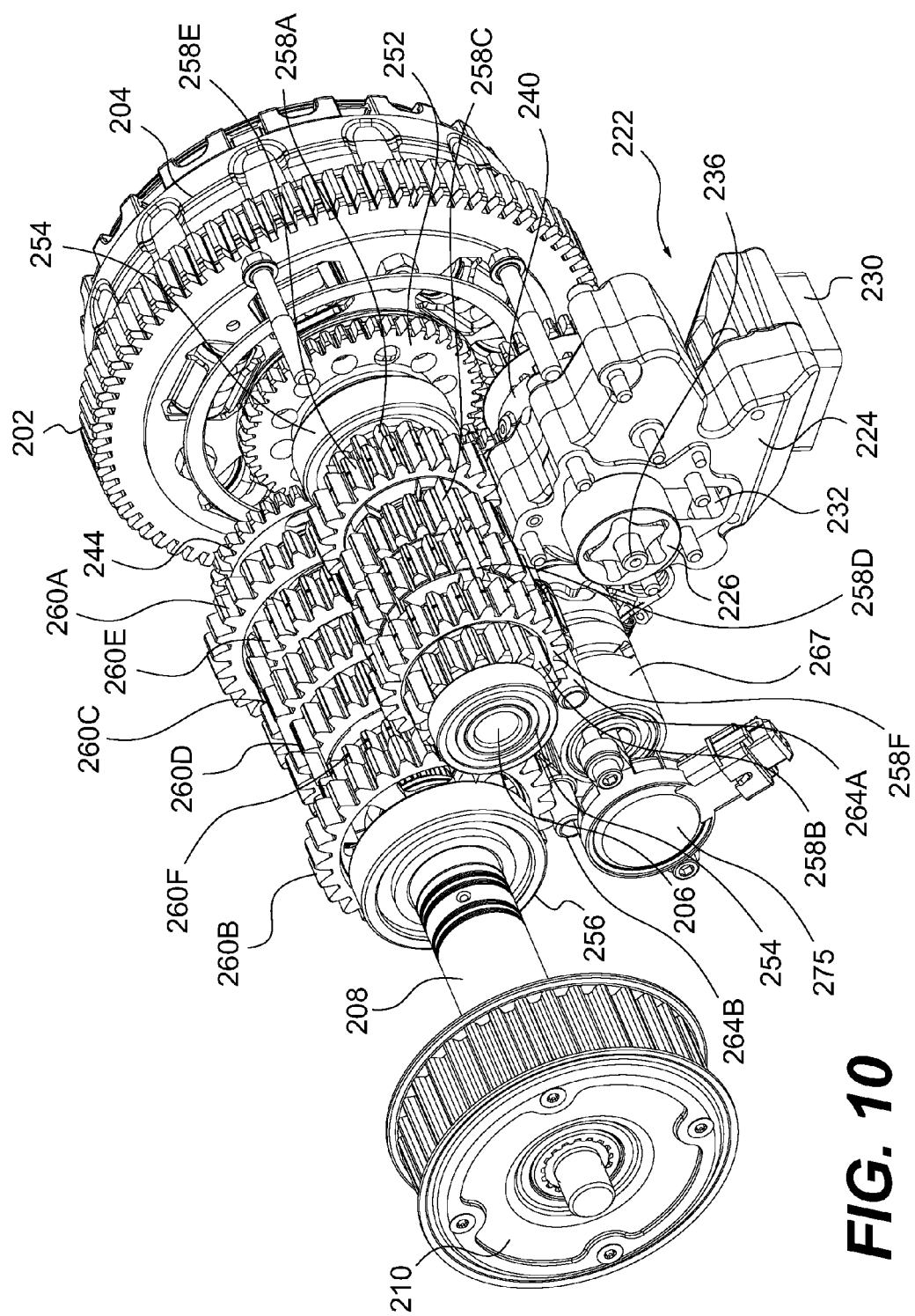
FIG. 10 is a perspective view taken from a front, right side of internal components of a transmission of the three-wheel vehicle of FIG. 1.

The pumping unit 222 and its driving mechanism will be described with reference to FIGS. 10 to 12 and 21. The pumping unit 222 includes a housing 224 and two gear pumps 226, 228 (see FIG. 21) disposed in the housing 224. Note that the pump 226 is normally disposed inside a cover of the housing 224 that has been removed in FIG. 10. The housing 224 separates the two pumps 226, 228 from each other by forming distinct pump chambers. The housing 224 of the pumping unit 222 has a scavenge tube 230 at a bottom thereof. The scavenge tube 230 has a downwardly facing opening (not shown) which is disposed below a level of oil at the bottom of the housing 214 of the transmission 200. When the pumps 226, 228 operate, oil is sucked through the scavenge tube 230 from the bottom of the housing 214 and is supplied to the pump 226 via passages in the housing 224 (one of which, passage 232, is shown in FIG. 10). From the pump 226, oil is returned to the oil tank of the engine 100. The oil tank fluidly communicates with an oil filter 234 mounted to the back of the housing 214 (see FIG. 6). Oil flows from the oil tank to the oil filter 234 by gravity, thus keeping the oil filter filled with oil. The pump 228 sucks oil from the oil filter 234 and supplies it to a hydraulic actuator (not shown) used to move the transmission 200 between its various shift positions and to engage the clutch 204 as will be described in greater detail below. A portion of the oil in the hydraulic actuator leaks into the housing 214 of the transmission 200 and is returned to the oil tank by the pump 226 as described above.

Figure 11:
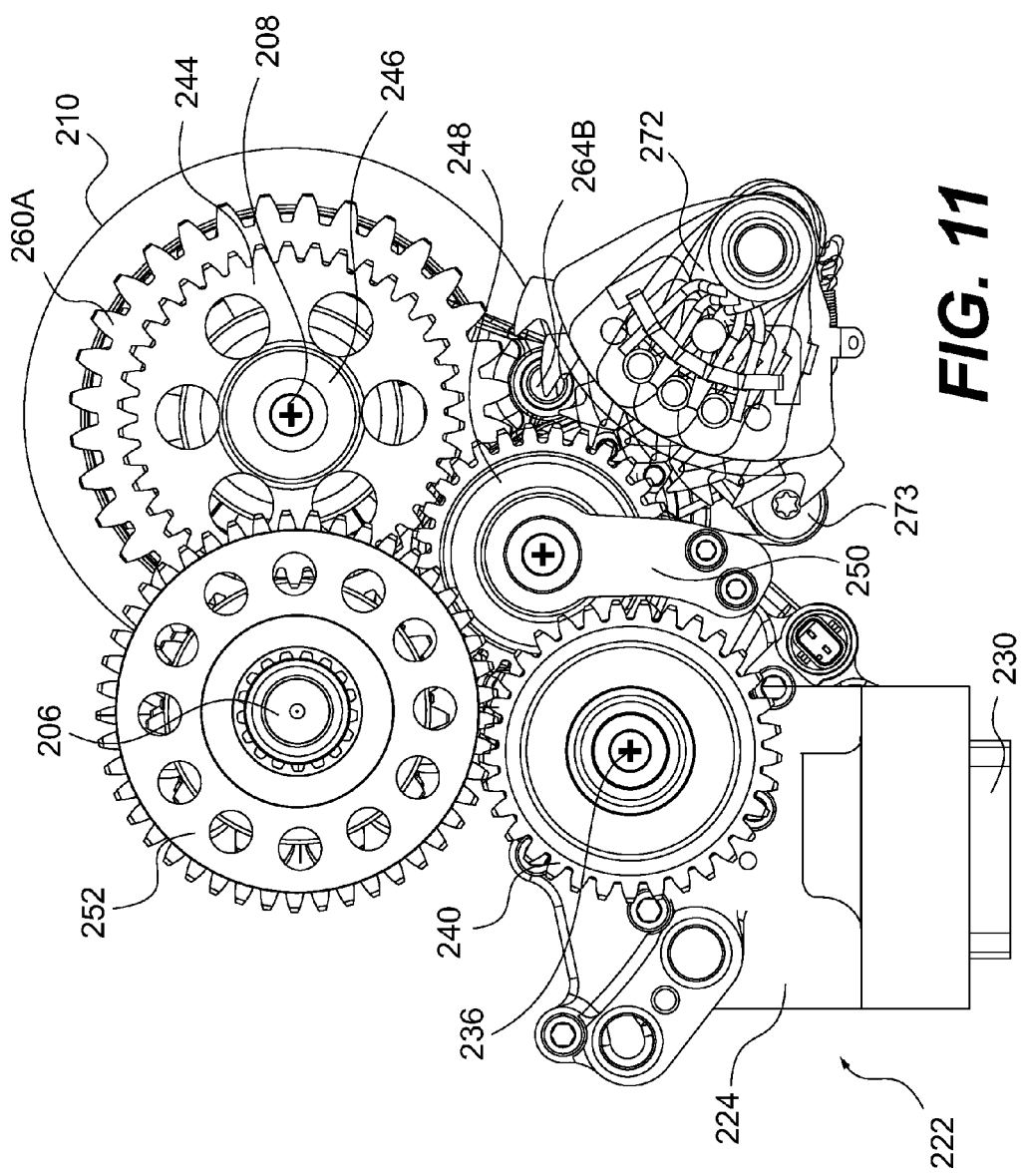
FIG. 11 is a left side elevation view of the internal components of the transmission of FIG. 10 with a clutch removed.
Figure 12:
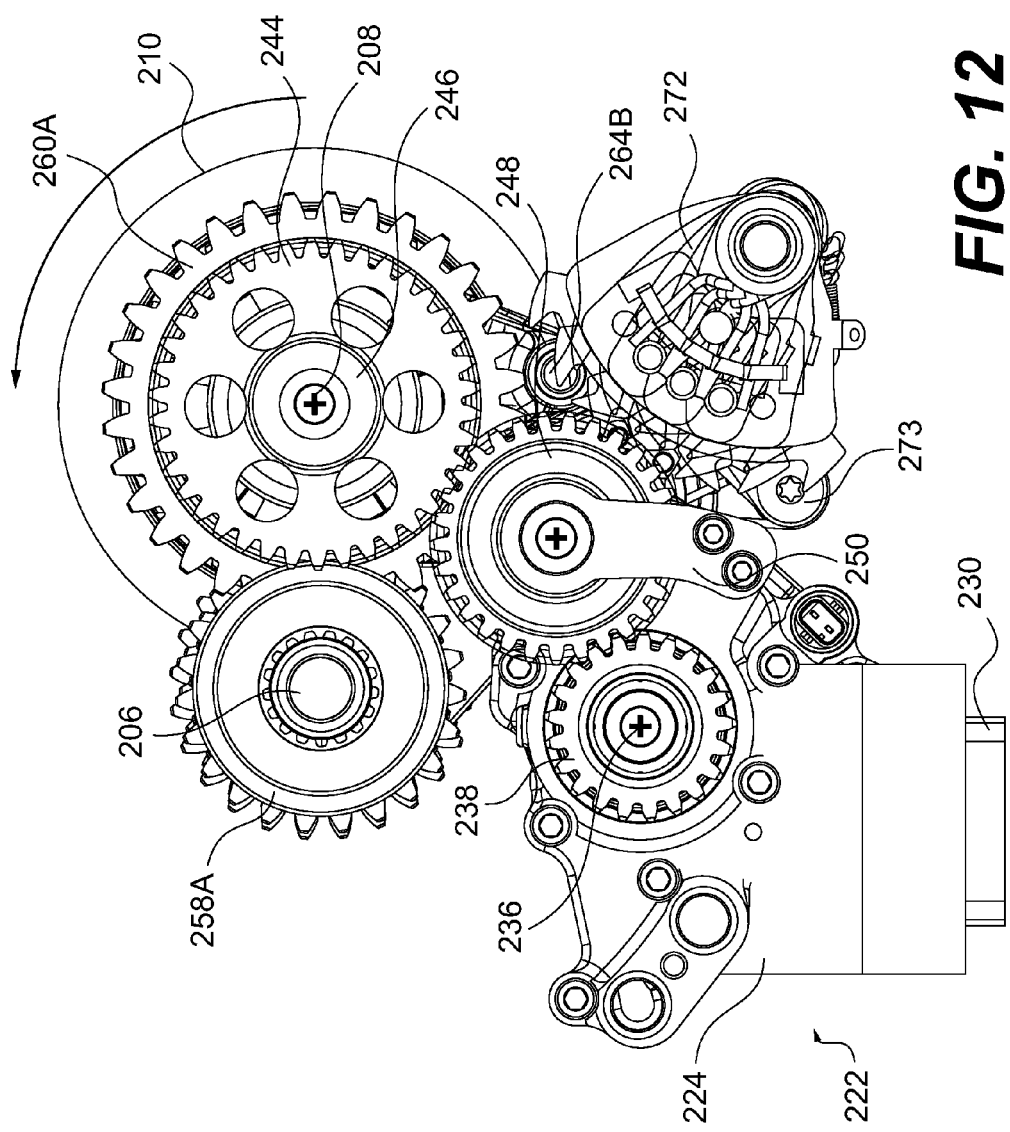
FIG. 12 is a left side elevation view of the internal components of the transmission of FIG. 10 with the clutch and gears used to drive a pumping unit from the engine removed.
Figure 13:
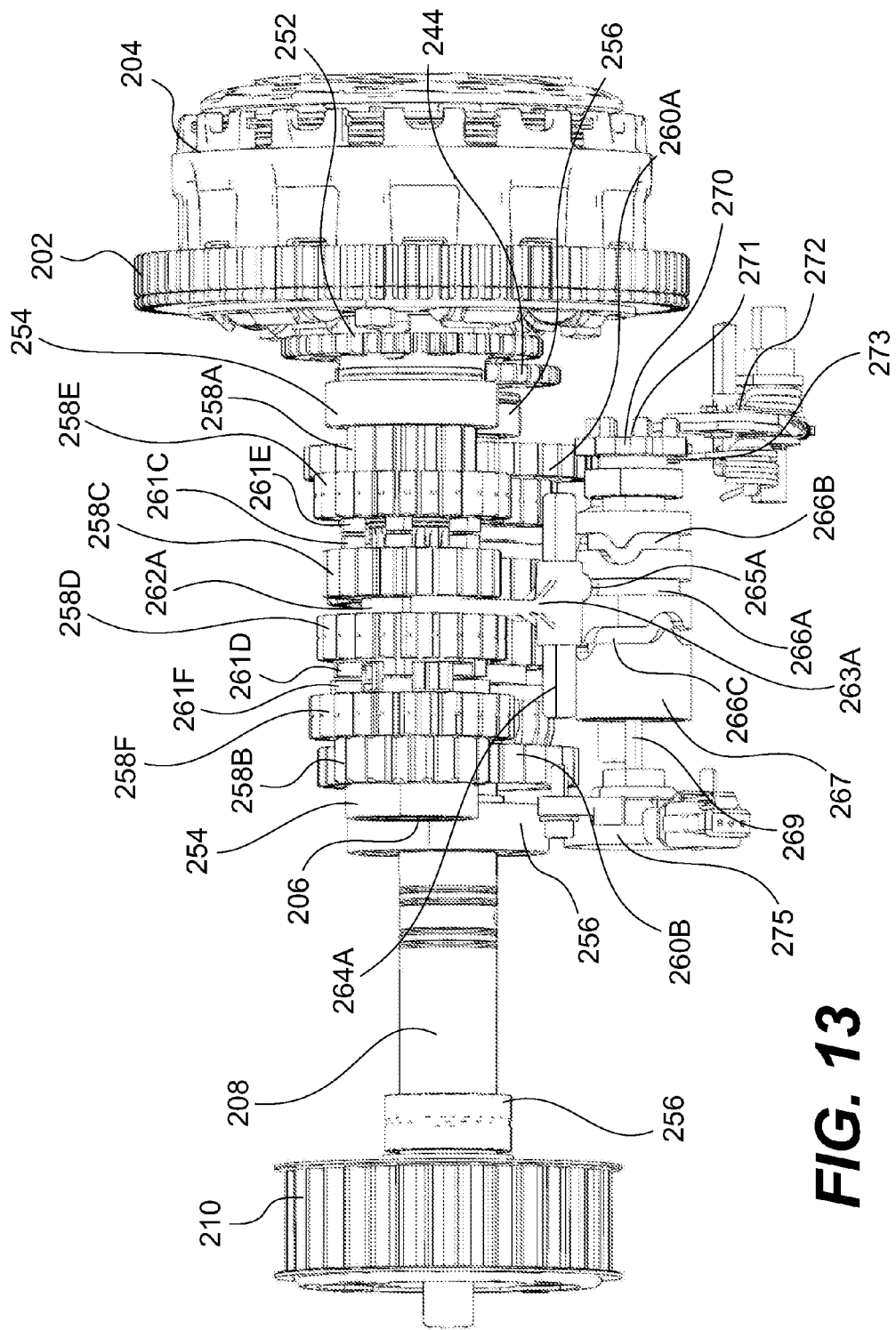
FIG. 13 is a front elevation view of the internal components of the transmission of FIG. 10 with the pumping unit removed.
Figure 14:
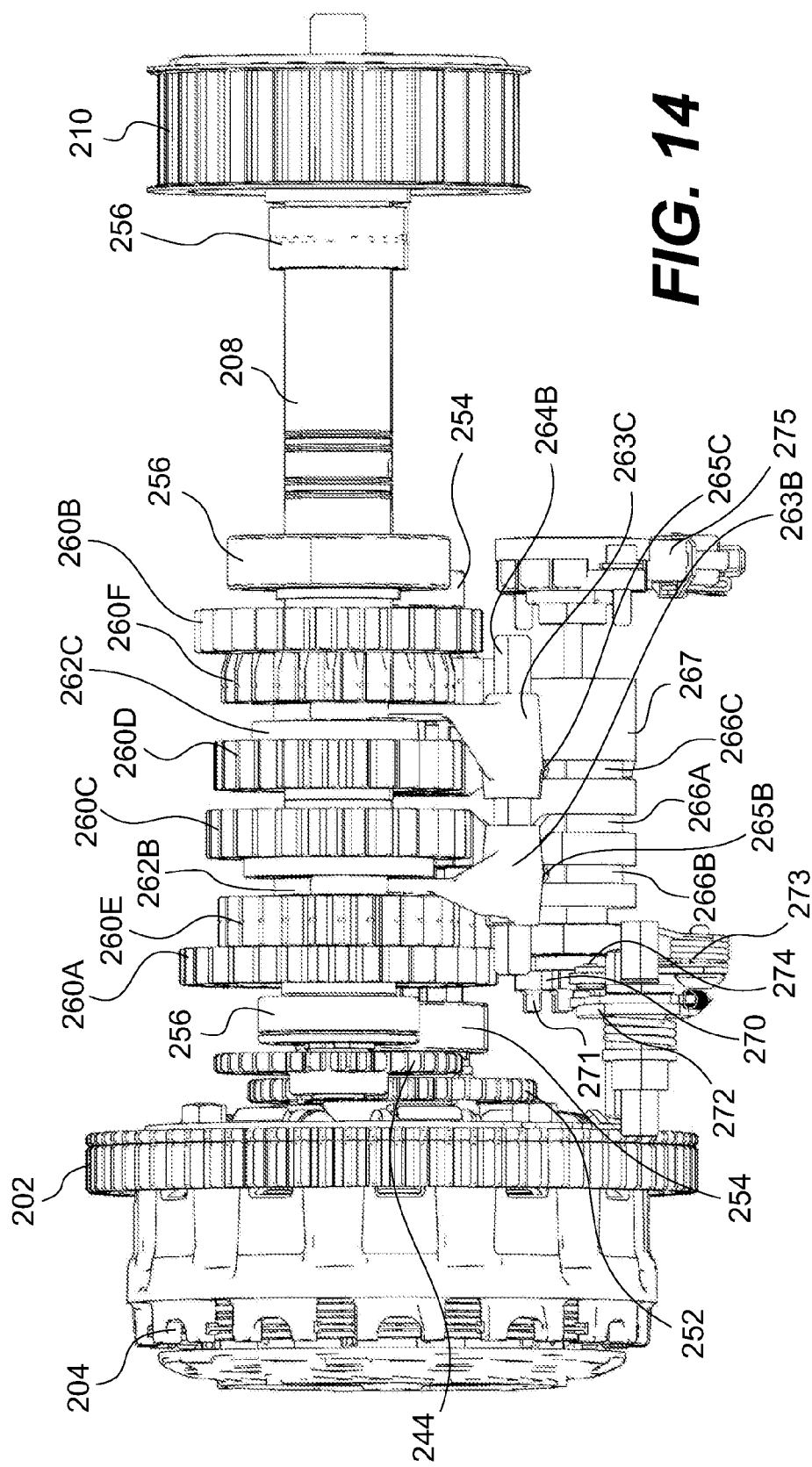
FIG. 14 is a rear elevation view of the internal components of the transmission of FIG. 10 with the pumping unit removed.
Figure 15:
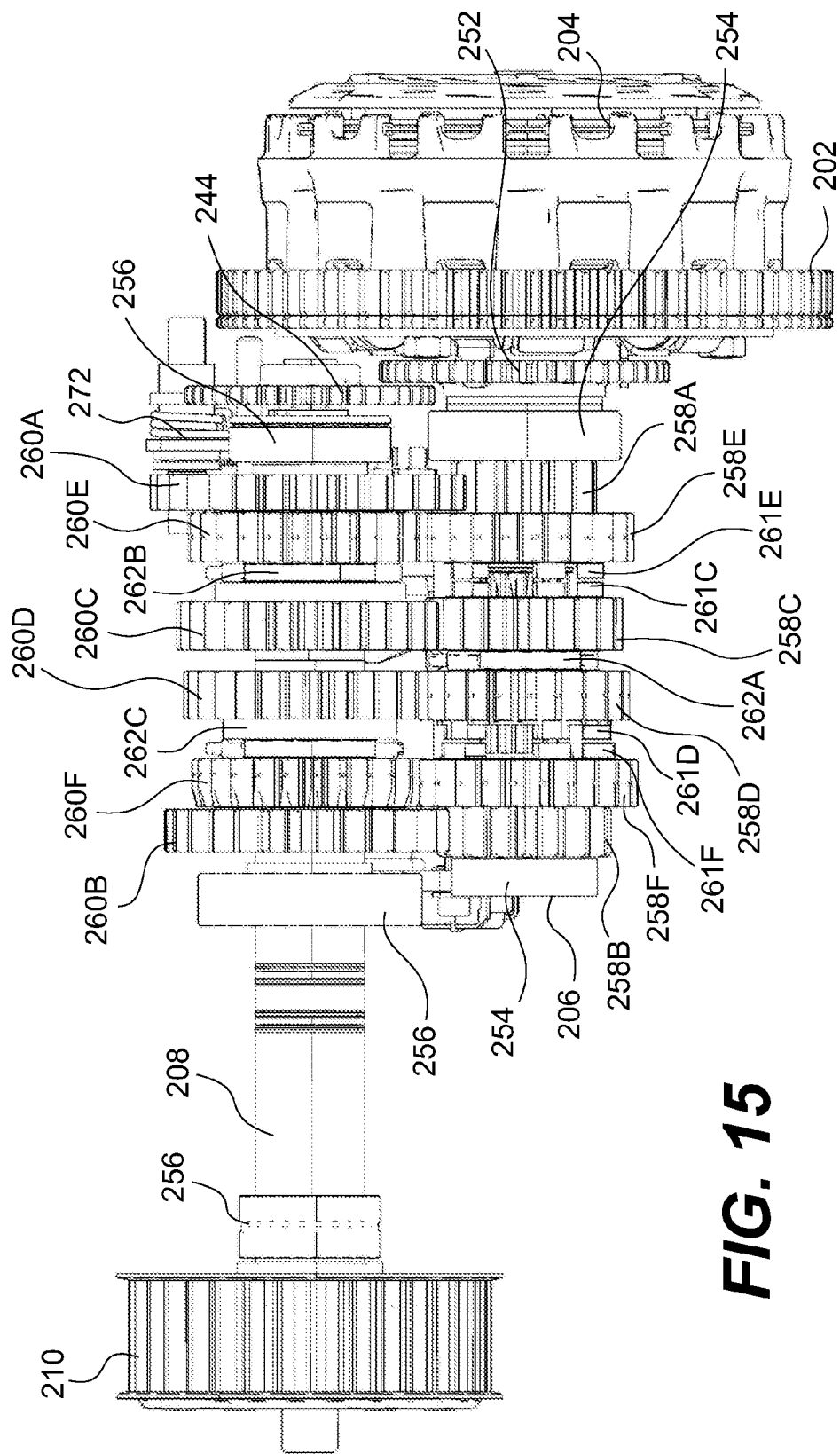
FIG. 15 is a top plan view of the internal components of the transmission of FIG. 10 with the pumping unit removed.
Figure 16:
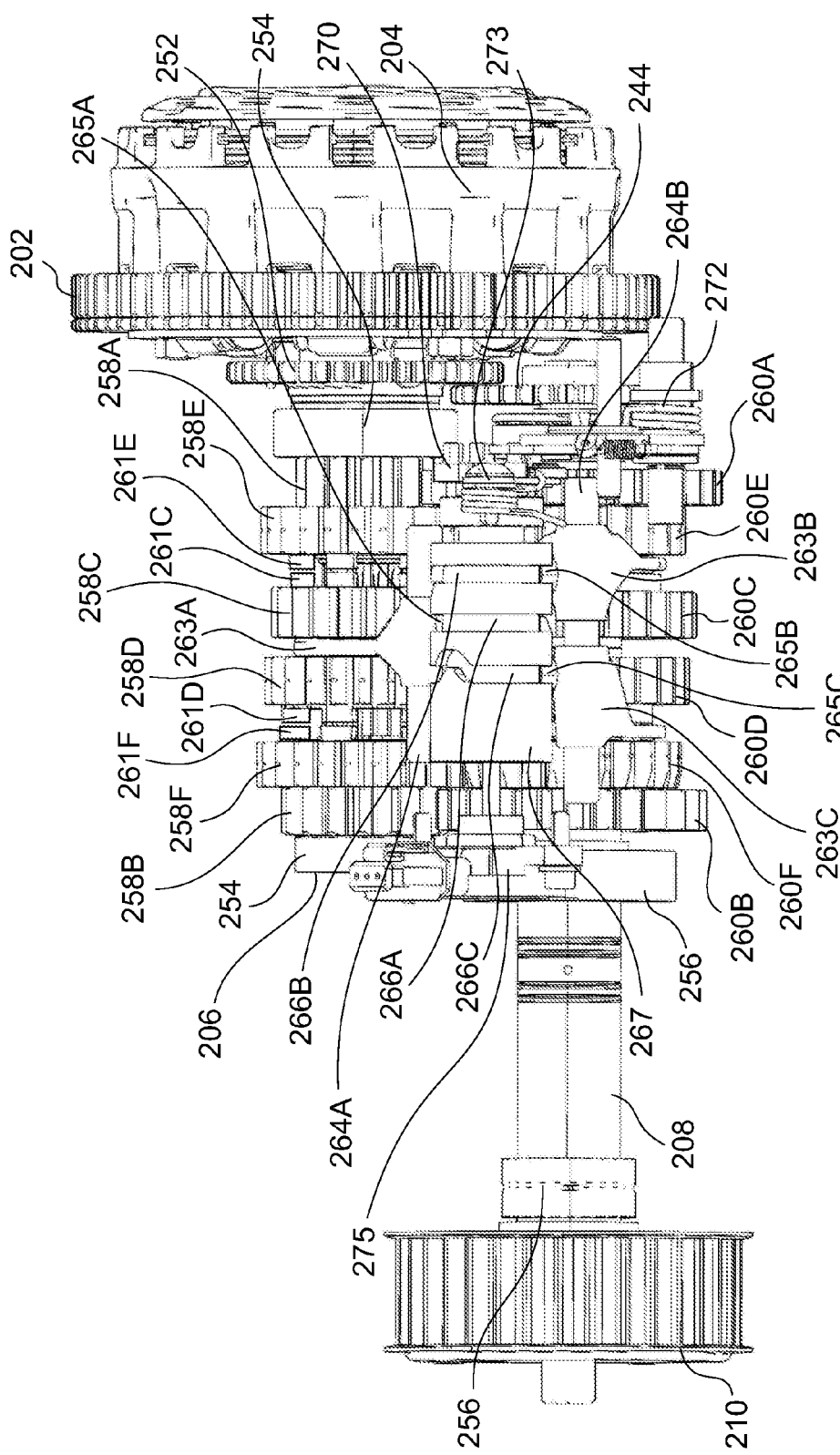
FIG. 16 is a bottom plan view of the internal components of the transmission of FIG. 10 with the pumping unit removed.
Figure 21:
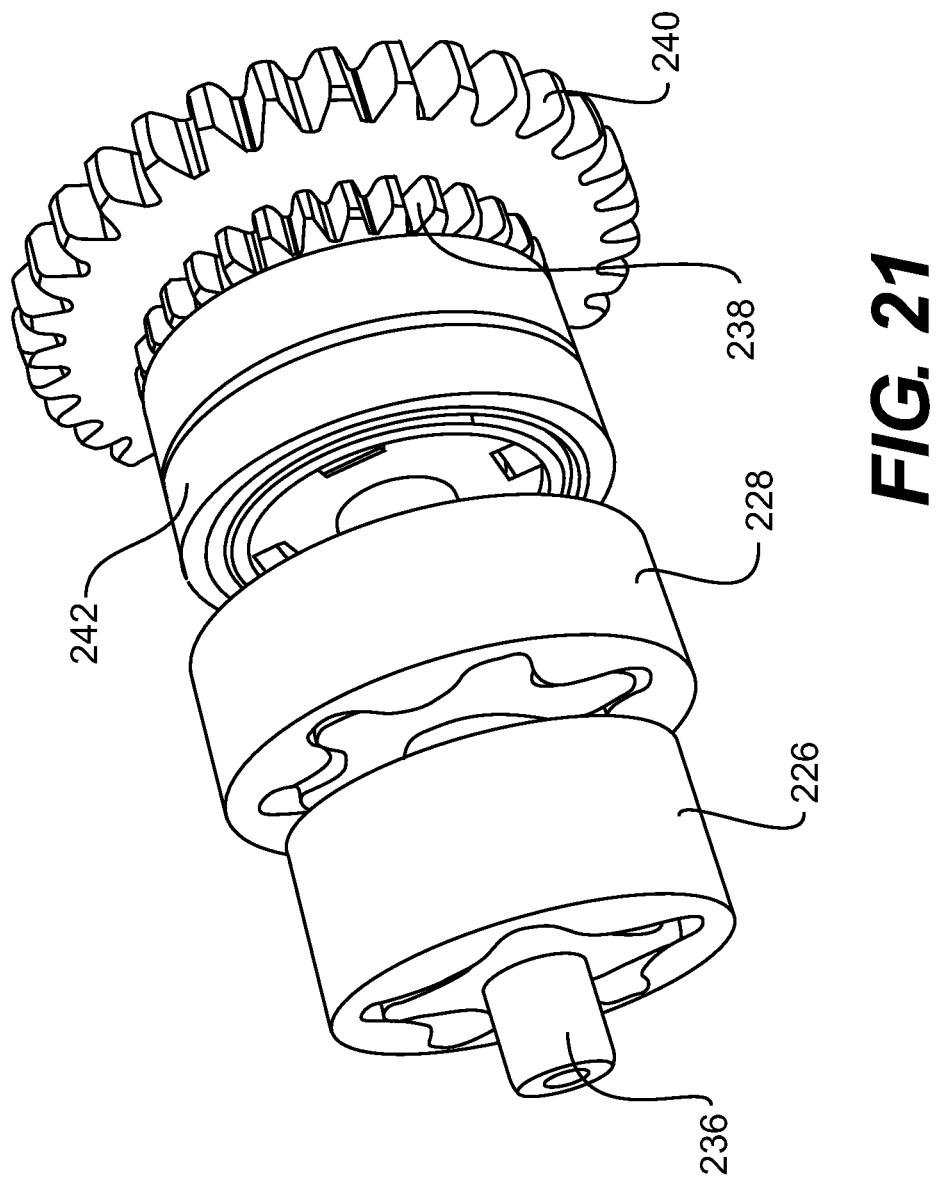
FIG. 21 is a perspective view taken from a front, right side of a pump assembly of the pumping unit of the transmission of FIG. 10.

As best seen in FIG. 21, the pumps 226, 228 are disposed on and driven by a shaft 236. The shaft 236 is driven by gears 238, 240 disposed at the end of the shaft 236. The gear 240 is connected to the shaft 236 by a one-way clutch 242. As best seen in FIG. 12, a gear 244 is connected to the output shaft 208 via a one-way clutch 246. The gear 244 drives an idler gear 248 that is rotatably connected to an arm 250 connected to the housing 224 of the pumping unit 222. The idler gear 248 drives the gear 238. As such, the shaft 236, and therefore the pumps 226, 228, can be driven by the output shaft 208. As best seen in FIG. 11, a gear 252 is connected to the input shaft 206. The gear 252 drives the gear 240. As such, the shaft 236, and therefore the pumps 226, 228, can be driven by the input shaft 206. The two one-way clutches 242, 246 ensure that the shaft 236 is driven by the one of the input shaft 206 and the output shaft 208 that provides the fastest rotation speed to the shaft 236, thus preventing torque from being transferred between the input and output shafts 206, 208 via the gears 238, 240, 244, 248 and 252. For example, when the transmission 200 is in a neutral shift position, with only the electric motor 300 driving the vehicle 10 (i.e. the engine 100 is turned off), the shaft 236 is driven by the output shaft 208 since the one-way clutch 242 is slipping. Similarly, when the transmission 200 is in a shift position where the output shaft 208 rotates more slowly than the input shaft 206, with the engine 100 driving the vehicle 10, with or without the assistance of the electric motor 300, the shaft 236 is driven by the input shaft 206 since the one-way clutch 246 is slipping.

Turning now to FIGS. 10 to 18, the transmission components of the transmission 200 will be described in more detail. The input shaft 206 is rotationally supported by two bearings 254 in the housing 214. The output shaft 208 is rotationally supported by three bearings 256 in the housing 214. The input and output shaft are parallel to each other. Six input gears 258A to 258F are disposed on the input shaft 206. The six input gears 258A to 258F all have different diameters. Six output gears 260A to 260F are disposed on the output shaft 208. The six output gears 260A to 260F all have different diameters. Each one of the input gears 258A to 258F engages one of the output gears 260A to 260F respectively. The letters A to F following the reference numerals for the gears 258, 260 identify the gears 258, 260 responsible for the transfer of torque between the input and output shafts 206, 208 at each one of the shift positions of the transmission 200. The letters A to F correspond to the first to sixth gears respectively. For example, when the transmission 200 is in the third shift position, torque is transferred between the input shaft 206 and the output shaft 208 by the input gear 258C and the output gear 260C.

The input gear 258A is integrally formed with the input shaft 206. However it is contemplated that the input gear 258A could be otherwise rotationally and axially fixed relative to the input shaft 206. The corresponding output gear 260A is axially fixed relative to the output shaft 208 but can rotate independently of the output shaft 208. The output gear 260A has recesses (not shown) formed in a side thereof facing the output gear 260E.

The input gear 258B is splined on the input shaft 206 so as to be rotationally and axially fixed relative to the input shaft 206. The corresponding output gear 260B is axially fixed relative to the output shaft 208 but can rotate independently of the output shaft 208. The output gear 260B has recesses (not shown) formed in a side thereof facing the output gear 260F.

The input gear 258C is integrally formed with the input gear 258D. The gears 258C and 258D form a shifting sleeve 262A therebetween. The input gears 258C and 258D are splined on the input shaft 206 so as to be rotationally fixed but axially movable relative to the input shaft 206. The input gear 258C has teeth 261C extending toward the input gear 258E. The input gear 258D has teeth 261D extending toward the input gear 258F. The corresponding output gears 260C and 260D are axially fixed relative to the output shaft 208 but can rotate independently of the output shaft 208. The output gear 260C has recesses (not shown) formed in a side thereof facing the output gear 260E. The output gear 260D has recesses (not shown) formed in a side thereof facing the output gear 260F.

The input gear 258E is axially fixed relative to the input shaft 206 but can rotate independently of the input shaft 206. The input gear 258E has teeth 261E extending toward the input gear 258C. The corresponding output gear 260E is splined on the output shaft 208 so as to be rotationally fixed but axially movable relative to the output shaft 208. The output gear 260E has teeth (not shown) extending toward the output gear 260A. A shifting sleeve 262B is integrally formed with the output gear 260E so as to move therewith and is disposed between the output gears 260E and 260C. The shifting sleeve 262B has teeth (not shown) extending toward the output gear 260C.

The input gear 258F is axially fixed relative to the input shaft 206 but can rotate independently of the input shaft 206. The input gear 258F has teeth 261F extending toward the input gear 258D. The corresponding output gear 260F is splined on the output shaft 208 so as to be rotationally fixed but axially movable relative to the output shaft 208. The output gear 260F has teeth (not shown) extending toward the output gear 260B. A shifting sleeve 262C is integrally formed with the output gear 260F so as to move therewith and is disposed between the output gears 260F and 260D. The shifting sleeve 262C has teeth (not shown) extending toward the output gear 260D.

In view of the above, each pair of corresponding gears 258, 260 includes one of the gears 258 and 260 that is rotationally fixed relative to its corresponding shaft 206 or 208. The other one of the gears 258 and 260 of each pair can rotate independently of its corresponding shaft 206 or 208. As such, when each one of the input gears 258A to 258F is axially aligned with its corresponding output gear 260A to 260F, no torque is transmitted between the input and output shafts 206, 208. As will be described below in more detail, by moving the gears 258C, 258D, 260E and 260F axially along their corresponding shaft 206 or 208, their corresponding teeth 261 engage the teeth 261 or recesses of a corresponding adjacent one of the gears 258 or 260 that can rotate independently of its corresponding shaft 206 or 208, causing it to become rotationally fixed relative to its corresponding shaft 206 or 208. As a result, both gears 258 and 260 of a pair of corresponding gears 258 and 260 are now rotationally fixed, thus permitting the transfer of torque between the input and output shafts 206, 208.

In order to move the gears 258C and 258D axially along the input shaft 206, a shift fork 263A engages the shifting sleeve 262A. The shift fork 263A is connected and is axially movable along a shift fork rod 264A. The shift fork 263A has a pin 265A received inside a groove 266A of a shift drum 267. In order to move the gear 260E axially along the output shaft 208, a shift fork 263B engages the shifting sleeve 262B. The shift fork 263B is connected and is axially movable along a shift fork rod 264B. The shift fork 263B has a pin 265B received inside a groove 266B of the shift drum 267. In order to move the gear 260F axially along the output shaft 208, a shift fork 263C engages the shifting sleeve 262C. The shift fork 263C is connected and is axially movable along the shift fork rod 264B. The shift fork 263C has a pin 265C received inside a groove 266C of the shift drum 267.

Figure 19:
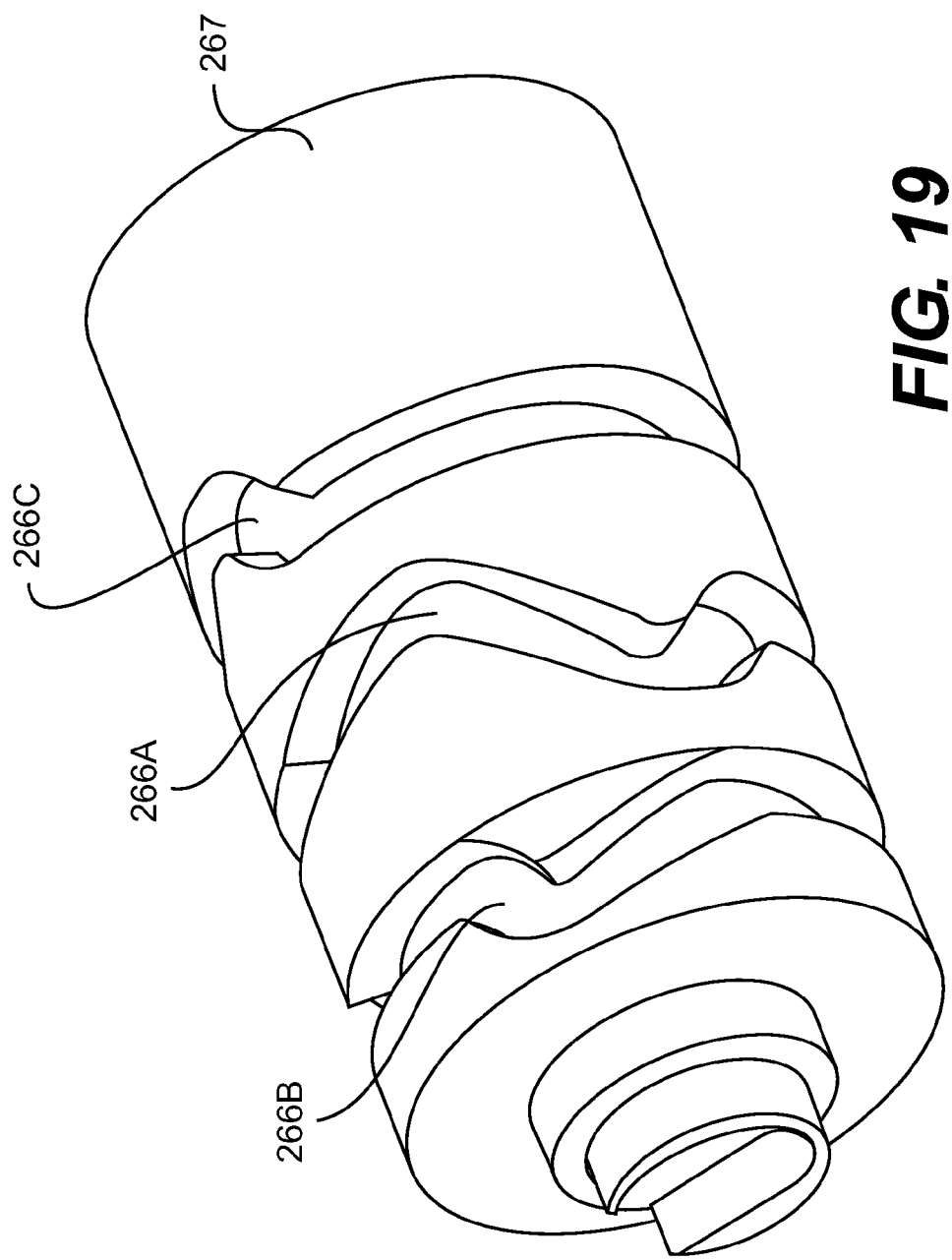
FIG. 19 is a perspective view taken from a rear left side of a shift drum of the transmission of the three-wheel vehicle of FIG. 1.
Figure 20:
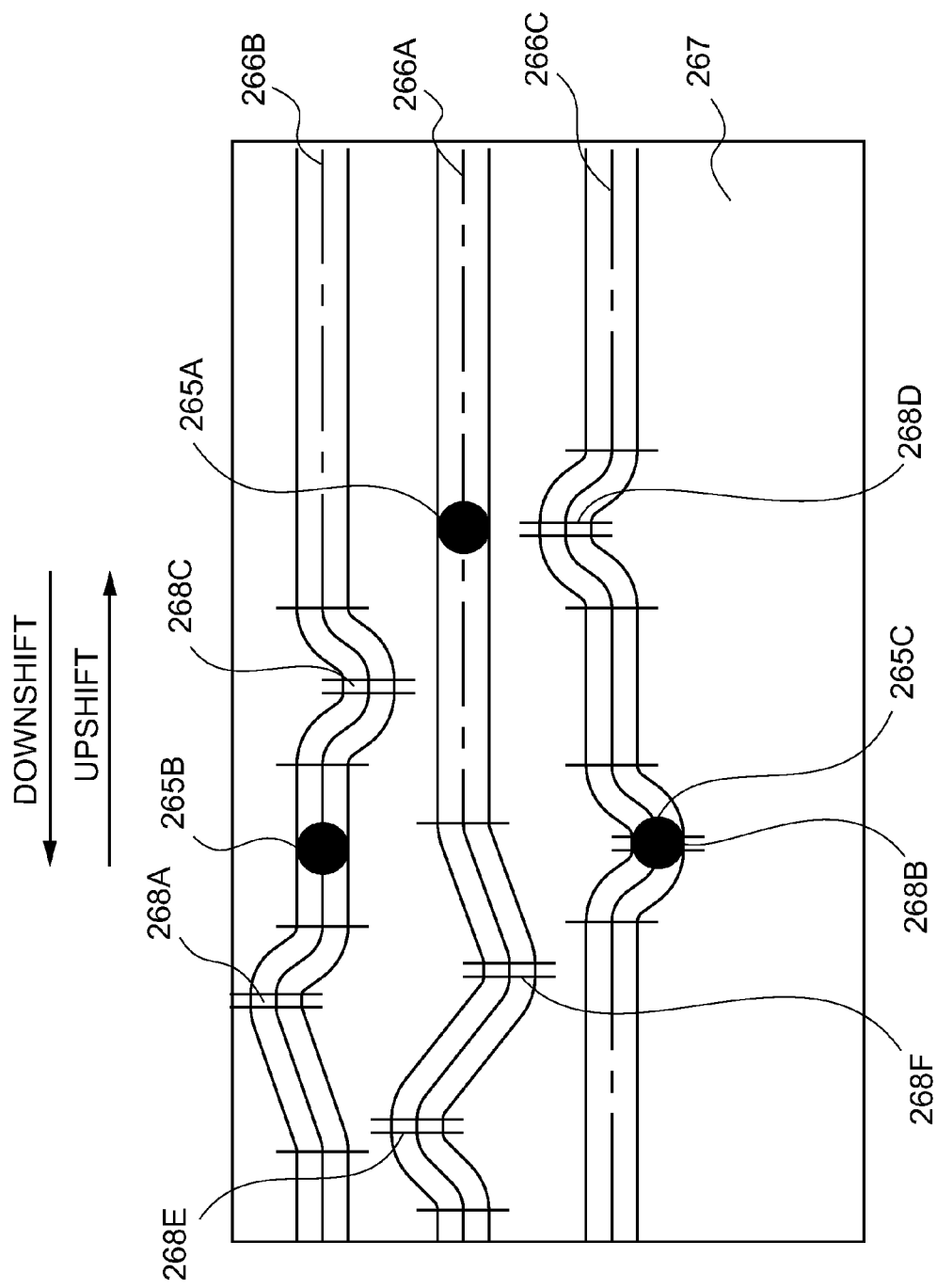
FIG. 20 is a view of an outer surface of the shift drum of FIG. 19 unrolled onto a plane and showing profiles of grooves of the shift drum.

As can be seen in FIGS. 19 and 20, the grooves 266A to 266C of the shift drum 267 have straight portions and curved portions. As the shift drum 267 rotates, the pins 265A to 265C follow the path of their corresponding grooves 266A to 266C respectively. When a pin 265 is in a straight section of its corresponding groove 266, the associated shift fork 263 is said to be in a neutral position. When a shift fork is in a neutral position, the teeth of the corresponding shifting sleeve 262 and/or the gear(s) 258 or 260 do not engage an adjacent gear 258 or 260, as the case may be. When a pin 265 is displaced by entering a curved portion of its corresponding groove 266, the associated shift fork 263 is displaced axially along its corresponding shift fork rod 264A or 264B. As a result, the teeth of the corresponding shifting sleeve 262 or gear 258 or 260 engage an adjacent gear 258 or 260, as the case may be, thus putting the transmission 200 in a shift position other than the neutral shift position. As such, by turning the shift drum 267 the various shifting positions of the transmission 200 can be selected in sequence. Since the transmission 200 has seven shift positions (i.e. first to sixth plus neutral), each shift position is separated from its sequentially consecutive shift position by a rotation of 51.4 degrees of the shift drum 267. As can be seen, all of the grooves 266A to 266C are continuous and span an entire circumference of the shift drum. As a result of this feature, when the shift drum 267 is in a position corresponding to the sixth shift position as described below, further rotation of the shift drum 267 in the upshift direction will cause the transmission to move to the neutral shift position. Similarly, when the shift drum 267 is in a position corresponding to the neutral shift position as described below, further rotation of the shift drum 267 in the downshift direction will cause the transmission to move to the sixth shift position.

The shifting sequence of the transmission 200 will now be described starting with the first shift position and moving in the upshift direction.

With reference to FIG. 20, when the shift drum 267 is in a position corresponding to the first shift position, the pin 265B is in an apex 268A of the groove 266B and the pins 265A and 265C are in straight portions of the grooves 266A and 266C respectively. As such, the shift forks 263A and 263C are in neutral positions. The shift fork 263B, and therefore the output gear 260E, moves toward the output gear 260A. The teeth of the output gear 260E engage the recesses in the output gear 260A, thereby causing the output gear 260A to be rotationally fixed relative to the output shaft 208. Therefore, torque can be transmitted between the input shaft 206 and the output shaft 208 via the gears 258A and 260A.

The shift drum 267 is then turned in the upshift direction by 51.4 degrees to reach a position corresponding to the second shift position. With reference to FIG. 20, in the second shift position, the pin 265C is in an apex 268B of the groove 266C and the pins 265A and 265B are in straight portions of the grooves 266A and 266B respectively. This is the position shown in FIG. 20. As such, the shift forks 263A and 263B are in neutral positions. The shift fork 263C, and therefore the output gear 260F, moves toward the output gear 260B. The teeth of the output gear 260F engage the recesses in the output gear 260B, thereby causing the output gear 260B to be rotationally fixed relative to the output shaft 208. Therefore, torque can be transmitted between the input shaft 206 and the output shaft 208 via the gears 258B and 260B.

The shift drum 267 is then turned in the upshift direction by 51.4 degrees to reach a position corresponding to the third shift position. With reference to FIG. 20, in the third shift position, the pin 265B is in an apex 268C of the groove 266B and the pins 265A and 265C are in straight portions of the grooves 266A and 266C respectively. As such, the shift forks 263A and 263C are in neutral positions. The shift fork 263B, and therefore the shifting sleeve 262B, moves toward the output gear 260C. The teeth of the shifting sleeve 262B engage the recesses in the output gear 260C, thereby causing the output gear 260C to be rotationally fixed relative to the output shaft 208. Therefore, torque can be transmitted between the input shaft 206 and the output shaft 208 via the gears 258C and 260C.

The shift drum 267 is then turned in the upshift direction by 51.4 degrees to reach a position corresponding to the fourth shift position. With reference to FIG. 20, in the fourth shift position, the pin 265C is in an apex 268D of the groove 266C and the pins 265A and 265B are in straight portions of the grooves 266A and 266B respectively. As such, the shift forks 263A and 263B are in neutral positions. The shift fork 263C, and therefore the shifting sleeve 262C, moves toward the output gear 260D. The teeth of the shifting sleeve 262C engage the recesses in the output gear 260D, thereby causing the output gear 260D to be rotationally fixed relative to the output shaft 208. Therefore, torque can be transmitted between the input shaft 206 and the output shaft 208 via the gears 258D and 260D.

The shift drum 267 is then turned in the upshift direction by 51.4 degrees to reach a position corresponding to the fifth shift position. With reference to FIG. 20, in the fifth shift position, the pin 265A is in an apex 268E of the groove 266A and the pins 265B and 265C are in straight portions of the grooves 266B and 266C respectively. As such, the shift forks 263B and 263C are in neutral positions. The shift fork 263A, and therefore the input gear 258C, moves toward the input gear 258E. The sides of the teeth 261C of the input gear 258C engage the sides of the teeth 261E of the input gear 258E, thereby causing the input gear 258E to rotate together with the input shaft 206. Therefore, torque can be transmitted between the input shaft 206 and the output shaft 208 via the gears 258E and 260E.

The shift drum 267 is then turned in the upshift direction by 51.4 degrees to reach a position corresponding to the sixth shift position. With reference to FIG. 20, in the sixth shift position, the pin 265A is in an apex 268F of the groove 266A and the pins 265B and 265C are in straight portions of the grooves 266B and 266C respectively. As such, the shift forks 263B and 263C are in neutral positions. The shift fork 263A, and therefore the input gear 258D, moves toward the input gear 258F. The sides of the teeth 261D of the input gear 258D engage the sides of the teeth 261F of the input gear 258F, thereby causing the input gear 258F to rotate together with the input shaft 206. Therefore, torque can be transmitted between the input shaft 206 and the output shaft 208 via the gears 258F and 260F.

The shift drum 267 is then turned in the upshift direction by 51.4 degrees to reach a position corresponding to the neutral shift position. With reference to FIG. 20, in the neutral shift position, the pins 265A, 265B and 265C are in straight portions of the grooves 266A, 266B and 266C respectively. As such, the shift forks 263A, 263B and 263C are in neutral positions and no torque is transmitted between the input shaft 206 and the output shaft 208.

Turning the shift drum 267 in the upshift direction by 51.4 degrees then returns the shift drum 267 in the position corresponding to the first shift position, and the above sequence can be repeated. It should be understood that the above sequence can be repeated in the downshift direction (i.e. neutral, sixth, fifth, fourth, third, second, first . . . ). It should also be understood that the direction of the sequence can be changed at any time. For example, one possible shifting sequence could be neutral, sixth, fifth, fourth, fifth, sixth, neutral, first, neutral. As can be seen in FIG. 20, the slopes of the groove 266A between the apex 268F and the adjacent straight portion in the upshift direction, and of the groove 266B between the apex 268A and the adjacent straight portion in the downshift direction are gentler than the other slopes. This facilitates the shifting between the sixth and neutral shift positions, and the neutral and first shift positions respectively.

Figure 17:
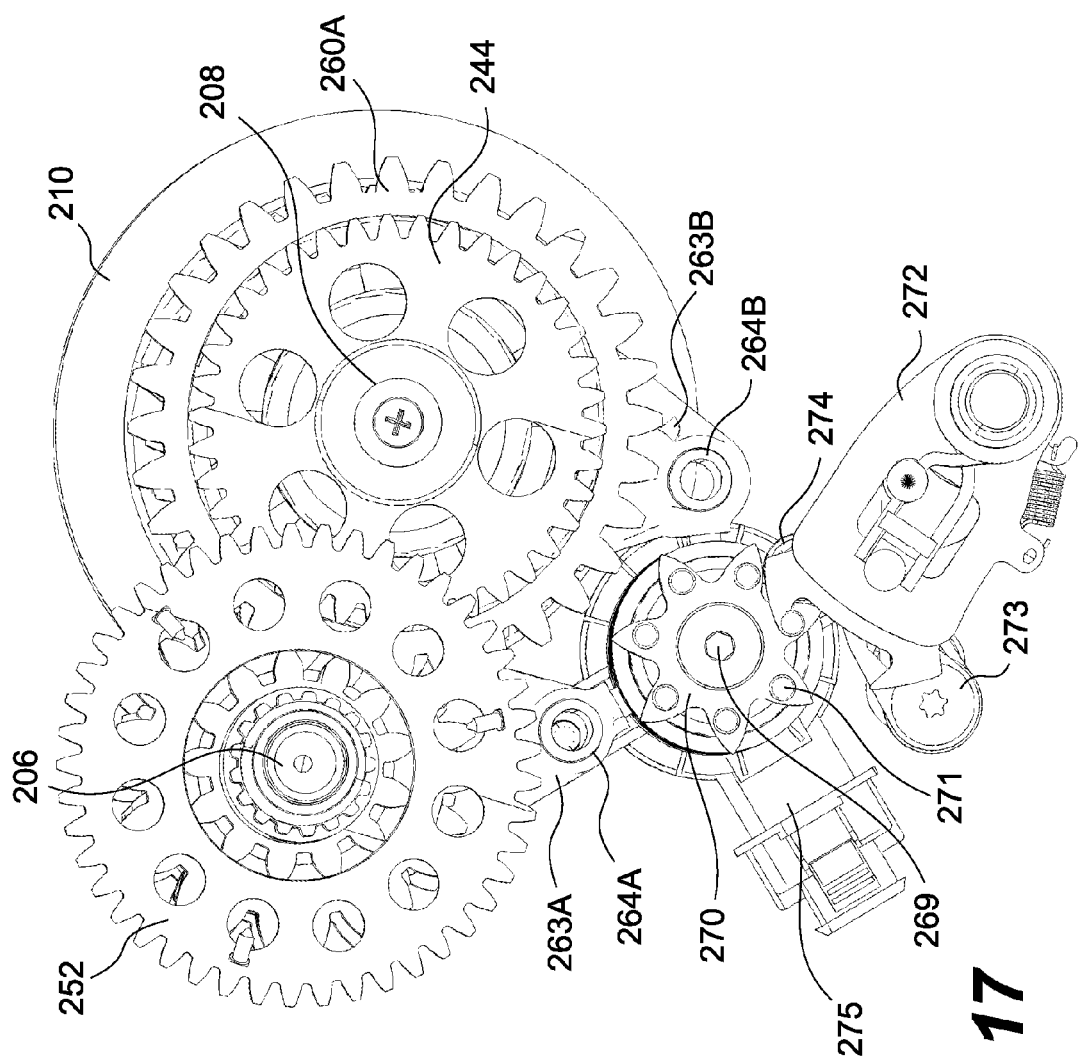
FIG. 17 is a left side elevation view of the internal components of the transmission of FIG. 10 with the pumping unit and the clutch removed.
Figure 18:
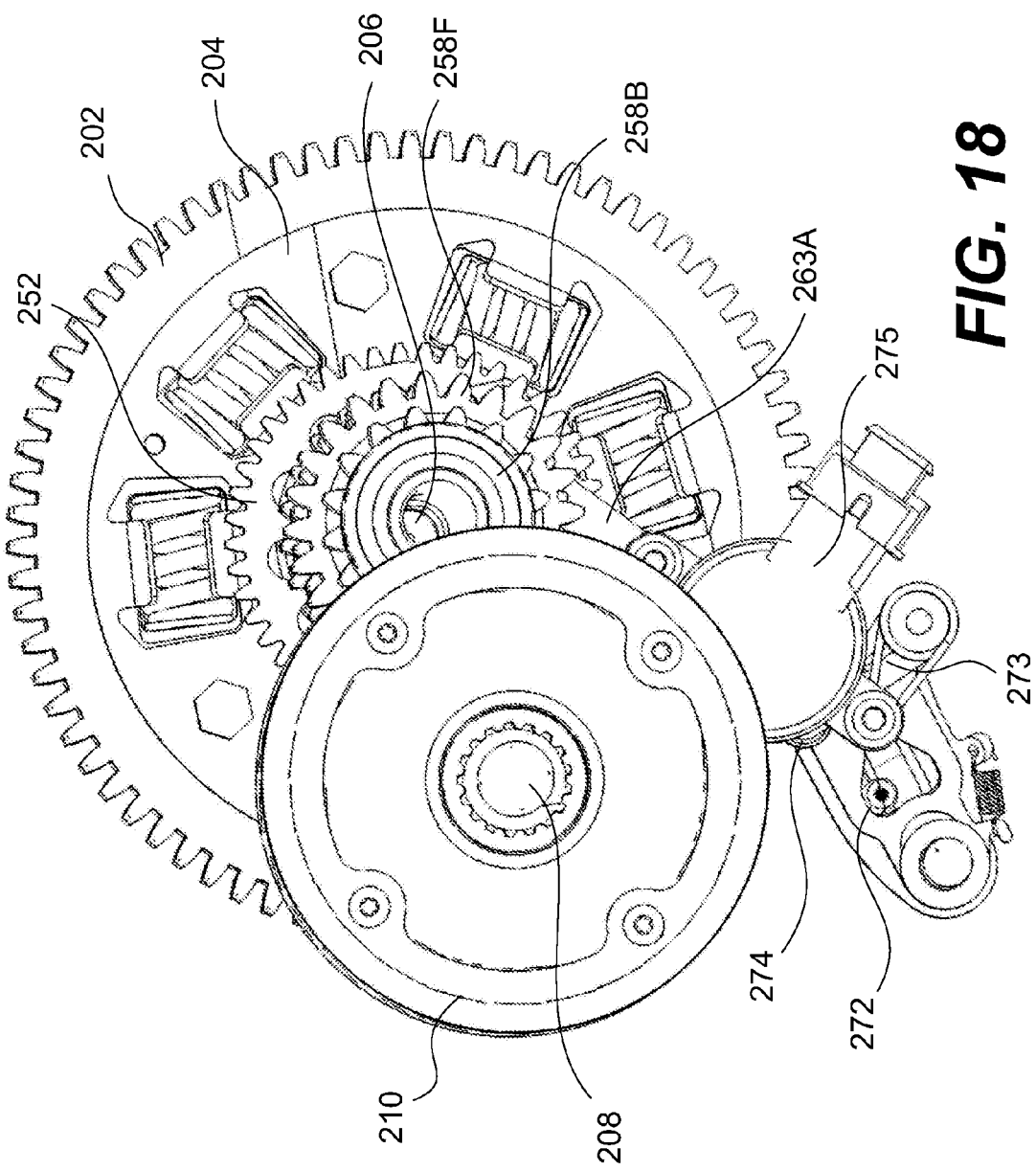
FIG. 18 is a right side elevation view of the internal components of the transmission of FIG. 10 with the pumping unit removed.

Turning now to FIGS. 17 and 18, a mechanism used to turn the shift drum 267 will be described. The shift drum 267 is fixedly connected to a shift shaft 269. An indexing wheel 270 is mounted to one end of the shift drum 267. As can be seen, the indexing wheel 270 has seven recesses and seven pins 271, one of each per shift position. A spring-loaded pawl 272 is actuated by the hydraulic actuator (not shown) connected to the pump 228 described above. The pawl 272 is moved by the hydraulic actuator to catch the pins 271 and turn the indexing wheel 270 and the shift drum 267 in the upshift or downshift direction. FIGS. 11 and 12 show the pawl 272 in its various positions. A spring-loaded arm 273 has a roller 274 on an end thereof. The arm 273 biases the roller 274 against the outer surface of the indexing wheel 270. The bias causes the roller 274 to turn the indexing wheel 270 until the roller 274 is received at the bottom of a recess in the indexing wheel 270, thus ensuring that the indexing wheel 270 is at the angle corresponding to the selected shift position. A shaft position sensor 275 is mounted on the end of the shift shaft 269 opposite the end where the indexing wheel 270 is located. The shaft position sensor 275 senses the angular orientation of the shift shaft 269 and can therefore determine in which of the shift positions the transmission 200 is currently engaged.

The operation of the hydraulic actuator moving the pawl 272 to select a shift position of the transmission 200 is controlled by the transmission control module (TCM). The shift position to be selected is determined by the TCM based on various parameters of the vehicle 10 received from the HCM such as, for example, a position of the throttle operator, a speed of the vehicle 10, a speed of the engine 100, a speed of the electric motor 300, and an operation mode of the vehicle 10 (i.e. the previously mentioned ELECTRIC, ECO, CHARGE and SPORT modes). This is done automatically. It is contemplated that the driver could manually upshift and downshift the transmission, in which case the TCM would control the pawl 272 based on the drivers input, but would automatically override the driver's commands under certain conditions, such as when switching from one mode of operation to another.

Figure 22:
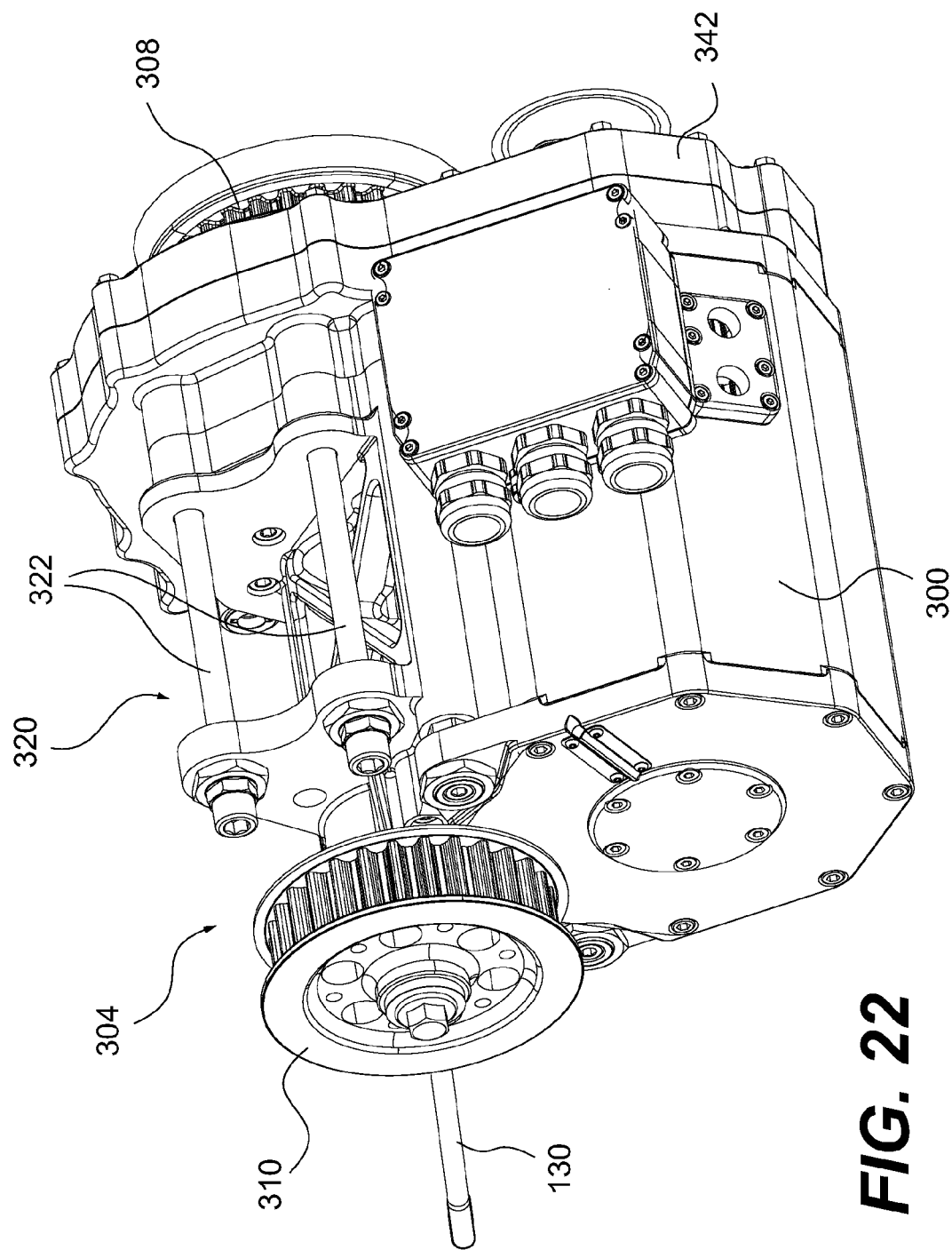
FIG. 22 is a perspective view taken from a rear, left side of an electric motor and torque transmission shaft assembly of the three-wheel vehicle of FIG. 1.
Figure 23:
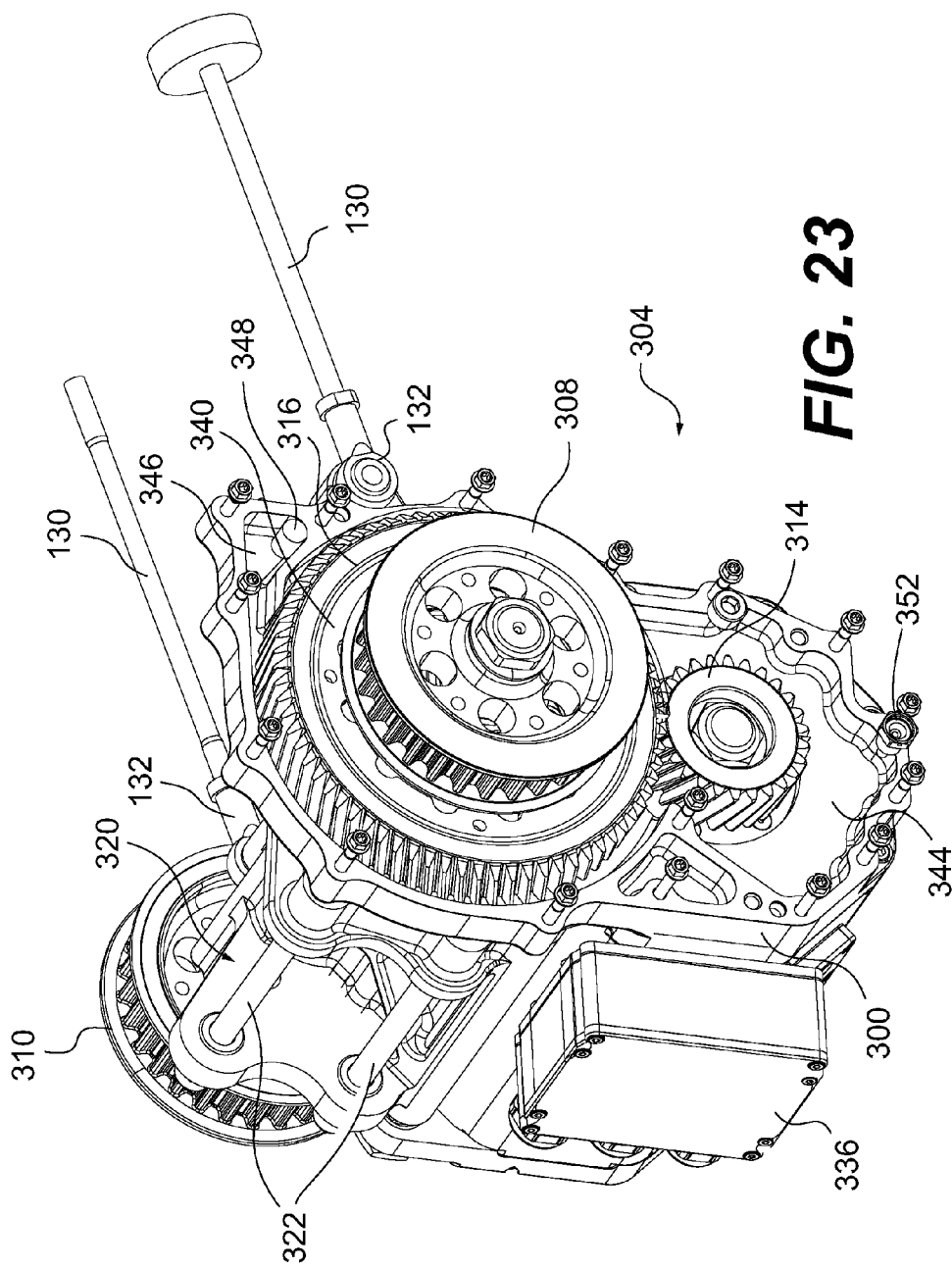
FIG. 23 is a perspective view taken from a rear right side of the electric motor and torque transmission shaft assembly of FIG. 22 with a right side cover removed.
Figure 24:
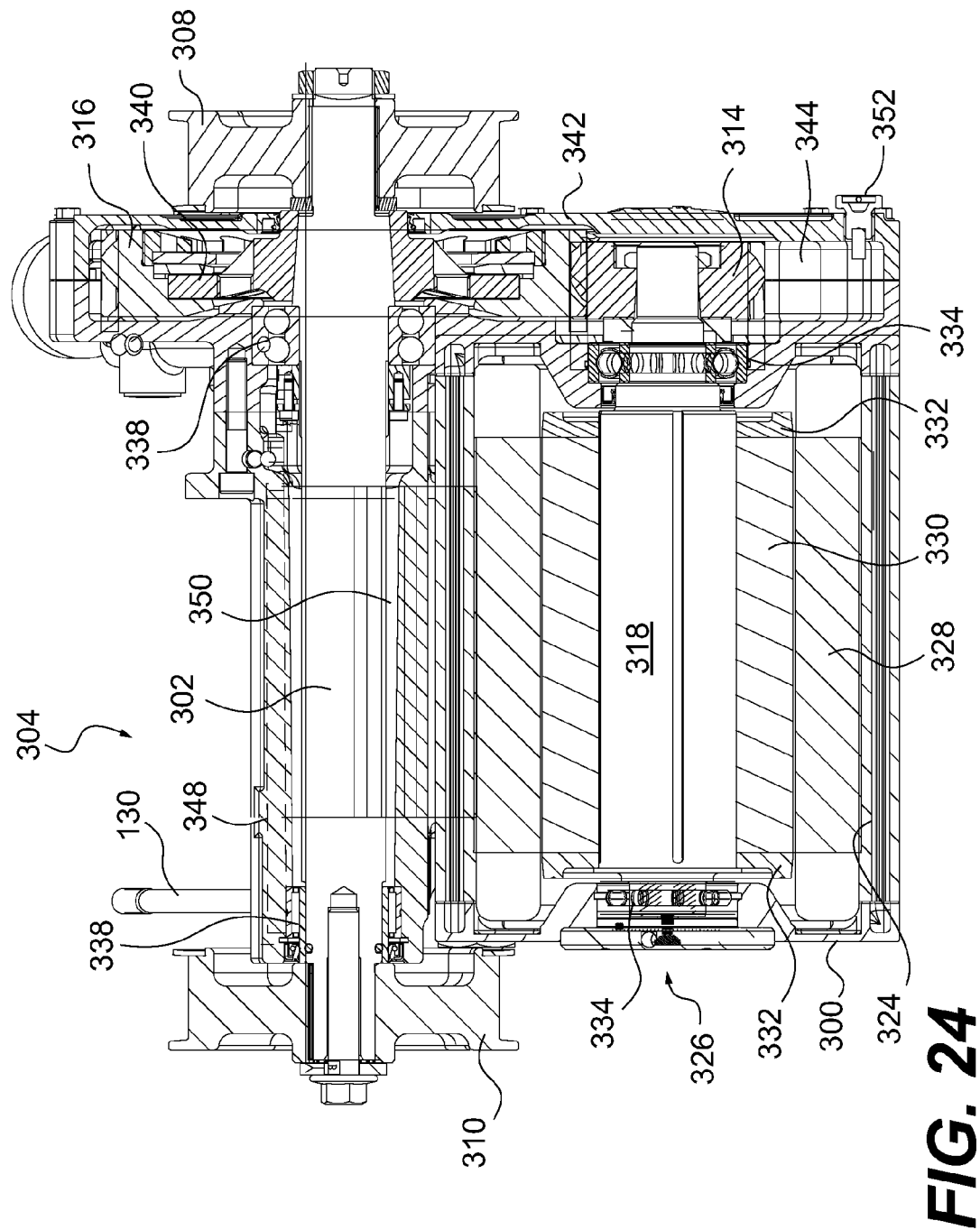
FIG. 24 is a lateral cross-section of the electric motor and torque transmission shaft assembly of FIG. 22.

Turning now to FIGS. 22 to 24, the assembly 304 consisting of the electric motor and of the torque transmission shaft 302 will be described in more detail. The lower portion of the assembly 304 consists of the electric motor 300. As can be seen in FIG. 24, the electric motor 300 includes a stator 324 and a rotor 326. The stator 324 carries the armature winding 328. The rotor 326 includes the shaft 318 that carries the permanent magnets 330 between rings 332. It is contemplated that the permanent magnets 330 could be replaced by field windings. The shaft 318 is rotationally supported inside the electric motor 300 by ball bearings 334.

An inverter (not shown) controls the operation of the electric motor 300. To run the electric motor 300, a 3-phase AC current is applied to the armature winding 328 of the stator 324 to generate a rotating magnetic field. The magnetic fields of the permanent magnets 330 cause the rotor 326 to rotate with the magnetic field of the stator 324, thereby turning the shaft 318. The inverter converts the DC current from the battery 306 to AC current to be applied to the armature winding 328. The inverter also controls the frequency of the AC current applied to the armature winding 328, thereby controlling the speed of rotation of the shaft 318. The HCM determines a torque to be generated by the electric motor 300 based on various parameters of the vehicle 10 such as, for example, a position of the throttle operator, a speed of the vehicle 10, a speed of the engine 100, a shift position of the transmission 200, and an operation mode of the vehicle 10. The HCM sends a signal representative of this torque to the inverter that then controls the AC current applied to the armature winding 328 to generate this torque.

Under certain conditions, such as when going downhill, it is possible to use the electric motor 300 to recharge the battery 306. This is known as recuperation. Under such conditions, no current is applied to the armature winding 328. The rotation of the shaft 318 causes the magnetic fields of the permanent magnets 330 to induce an AC current in the armature winding 328. The inverter converts this AC current to DC current and supplies it to the battery 306 to recharge it.

The torque transmission shaft 302 is supported in the upper portion of the assembly 304 by bearings 338. The gear 316 is mounted on the torque transmission shaft 302 by a friction clutch 340 disposed radially between the torque transmission shaft 302 and the gear 316.

The gears 314 and 316 are disposed inside a cover 342. The space 344 (FIG. 24) between the cover 342 and the remaining portion of the assembly 304 acts as an oil reservoir. The oil level in this reservoir is maintained above the lower end of the gear 314. As the gear 314 rotates, it flings some oil upwardly onto the gear 316, which in turn flings some of this oil into a passage 346 in the upper portion of the space 344. The oil that is flung into the passage 346 then flows into a passage 348 that extends to the left side of the assembly 304. The passage 348 slopes downwardly towards the left such that oil that enters the passage 348 flows toward the left by gravity. Oil that exits the left end of the passage flows into the left bearing 338 to lubricate it. From the left bearing 338, the oil flows inside the cavity 350 inside which the torque transmission shaft 302 is disposed. The cavity 350 expands slightly from left to right, thus causing the oil therein to flow towards the right by gravity. The oil then flows through the right bearing 338, downwards through the right bearing 334, thereby lubricating these bearings, and then back into the space 344. The oil finally flows back down at the bottom of the space 344. A plug 352 at the bottom of the cover 342 permits the oil to be drained from inside the space 344, when doing maintenance for example.

The various modes of operation of the drivetrain of the vehicle 10 will now be described. Unless otherwise indicated, the various modes are selected by the driver of the vehicle 10 via the switch 29. The driver can switch mode at any time, including when the vehicle 10 is in motion.

It is contemplated that during at least some of these modes, should the battery 306 be fully charged, a message would be displayed to the driver that recuperation (explained above) is no longer possible. The reason for this is that recuperation creates a mechanical load on the drivetrain that tends to decelerate the vehicle 10. As such, when recuperation is no longer possible, the deceleration characteristics of the vehicle 10 are somewhat affected.

It is contemplated that for at least some of these modes, when the driver stops the vehicle 10 on a sloped surface, that the electric motor 300 could be controlled to compensate for the force of gravity acting on the vehicle 10. As a result, the vehicle 10 would stay stationary even if the driver does not apply the brakes.

In the ELECTRIC mode of operation, the vehicle 10 is propelled only by the electric motor 300. As such, when this mode is selected, the HCM sends a signal to the TCM to maintain the clutch 204 in an opened position and to put the transmission 200 in the neutral position.

When the driver wants the vehicle 10 to move in reverse, as selected by the switch 28, the vehicle is propelled only by the electric motor 300 as in the ELECTRIC mode above, except that the shaft 318 of the electric motor 300 is made to turn in the opposite direction.

In the ECO mode of operation, the vehicle 10 operates as in the ELECTRIC mode described above until the vehicle 10 reaches a predetermined speed. In one exemplary embodiment, this speed is 50 km/hr. When the predetermined speed is reached, the HCM sends a signal to the TCM to place the transmission 200 in a shift position corresponding to a shift position that would normally be engaged would the internal combustion engine 100 be running at the current operating conditions of the vehicle 10. Once this shift position is determined, the TCM causes the transmission 200 to downshift sequentially from the neutral shift to the determined shift position. By downshifting from the neutral position, the sixth shift position is engaged first, thus limiting the initial acceleration of the input shaft 206 compared to initially engaging the first shift position from the neutral shift position. For example, should the determined shift position be the fifth shift position, the transmission 200 would shift from the neutral shift position, to the sixth shift position, and then to the fifth shift position. Once the correct shift position is engaged, the TCM sends a signal to the HCM to actuate the starter motor 164. The starter motor 164 then rotates the crankshaft 104 via the drive gear 102. The TCM then sends a signal to the clutch 204 to close. As a result, the crankshaft 104 of the engine 100 is driven by the electric motor 300 via the transmission 200, thus permitting the engine 100 to be started. As the starter motor 164 has already caused initial rotations of the crankshaft 104 of the engine 100 when the clutch 204 is closed, the torque required by the electric motor 300 to drive the engine 100 is reduced, thus avoiding undesired shocks on the drivetrain of the vehicle 10. It is contemplated that the actuation of the starter motor 164 could be omitted, hence the engine 100 could be started by the electric motor 300 without support by the starter motor 164. It is contemplated that under certain conditions, such as, but not limited to, low traction or low speed conditions, that the TCM could send a signal to the HCM to actuate the starter motor 164 prior to engaging the correct shift position so as to initiate rotation of the crankshaft 104 of the engine 100 to start the engine 100 and that, once the correct shift position is engaged, the TCM sends a signal to the clutch 204 to close. Once the engine 100 has started, the vehicle 10 can be driven by both the engine 100 and the electric motor 300 or only by the engine 100. When the vehicle 10 is only driven by the engine 100, the electric motor 300 charges the battery 306 as described above. It is contemplated that the electric motor 300 could also be operated to compensate for the torque variations resulting from the shifting of the transmission 200, thus providing smoother shifting. When the vehicle 10 falls back below the predetermined speed, the clutch 204 is opened, the engine 100 is shut down and the transmission 200 is returned to the neutral shift position. It is contemplated that, after the engine 100 has been started once, the transmission 200 could be returned to a shift position other than the neutral shift position.

In the CHARGE mode of operation, the vehicle 10 generally operates as in the ECO mode, but with a higher priority to recharging the battery 306. When the charge level of the battery is below a predetermined level, the HCM essentially uses only the engine 100 to drive the vehicle 10, and uses the electric motor 300 to charge the battery 306 as described above, regardless of the speed of the vehicle 10. It is contemplated that for high speeds or high acceleration of the vehicle 10, the HCM may use both the engine 100 and the electric motor 300 to drive the vehicle 10. When the predetermined level of charge is reached, the HCM operates the vehicle 10 as in the ECO mode. It is contemplated that this mode of operation could be selected automatically should the state of charge of the battery 306 be low, in which case a message would be displayed to the driver informing him of the change of mode. It is also contemplated that the vehicle 10 could be provided with a satellite navigation system that would automatically activate the CHARGE mode upon approaching an area in a programmed itinerary where "electric only" propulsion is preferred or mandatory, thus ensuring a full battery charge when this area is reached. It is contemplated that this same system could automatically engage the ELECTRIC mode when such an area is reached.

In the SPORT mode of operation, the vehicle 10 generally operates as in the ECO mode, but with a higher priority to providing the maximum amount of torque to the wheel 16. The HCM preferably uses both the engine 100 and the electric motor 300 to drive the vehicle 10, and controls the TCM to place the transmission in a lower shift position as compared to the ECO mode for the same other conditions, thus providing more available torque for rapid acceleration of the vehicle 10. When the torque required to drive the vehicle 10 is below a predetermined value, however, the HCM operates the vehicle 10 as in the ECO mode. For example, the HCM may then use the electric motor 300 to charge the battery 306. The engine 100 can be started as described above with respect to the ECO mode by using the electric motor 300 or by using the starter motor 164. It is contemplated that torque compensation by the electric motor 300 when shifting the transmission 200 could be omitted, thus providing a sportier feeling.

It is also contemplated that the drivetrain could be provided with a MAINTENANCE mode. This mode can be activated by maintenance personnel using electronic tools interfacing with the HCM. In this mode, the engine 100 is started using the starter motor 164 with the clutch 204 opened.

It is also contemplated that the drivetrain could be provided with an ENGINE-ONLY mode. This mode can be activated automatically by the HCM when, for example, the battery 306 is defective. In this mode, the engine 100 is started using the starter motor 164 with the clutch 204 opened, and the vehicle 10 is driven by the engine 100 only. To move the vehicle 10 after starting the engine 100, the TCM controls the clutch 204 close so as to engage the transmission 200 smoothly.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A drivetrain for a hybrid vehicle comprising:
at least one ground engaging element;
a torque transmission shaft operatively connected to the at least one ground engaging element to drive the ground engaging element;
an electric motor operatively connected to the torque transmission shaft, the electric motor selectively driving the torque transmission shaft and being selectively driven by the torque transmission shaft;
a transmission having an input shaft and an output shaft, the output shaft being operatively connected to the torque transmission shaft, the output shaft selectively driving the torque transmission shaft and being selectively driven by the torque transmission shaft,
the transmission having:
a shift drum having at least one groove, the at least one groove being continuous and spanning an entire circumference of the shift drum,
a neutral shift position where substantially no torque is transferred between the input shaft and the output shaft, a first shift position where torque is transferred between the input shaft and the output shaft by a first set of gears, in the first shift position a ratio of a speed of rotation of the input shaft to a speed of rotation of the output shaft is a highest ratio provided by the transmission, and at least one higher shift position including a highest shift position where torque is transferred between the input shaft and the output shaft by at least one other set of gears, in the highest shift position the ratio of the speed of rotation of the input shaft to the speed of rotation of the output shaft is the lowest ratio provided by the transmission, the transmission being capable of shifting directly from the neutral shift position to the first shift position and directly from the neutral shift position to the highest shift position, rotating the shift drum to a first position shifts the transmission in the neutral shift position, rotating the shift drum to a second position shifts the transmission in the first shift position, and rotating the shift drum to a third position shifts the transmission in the highest shift position; and the shift drum being rotatable directly from the first position to the second position and directly from the first position to the third position; and an internal combustion engine operatively connected to the input shaft of the transmission, the engine selectively driving the input shaft and being selectively driven by the input shaft.

2. The drivetrain of claim 1, wherein the shift drum has three grooves, each one of the three grooves being continuous and spanning the entire circumference of the shift drum; and wherein the at least one higher shift position includes a second shift position, a third shift position, a fourth shift position, a fifth shift position, and a sixth shift position, the sixth shift position being the highest shift position.

3. The drivetrain of claim 1, wherein the transmission includes an actuator for shifting the transmission between the neutral, first and at least one higher shift position; and further comprising a control module electronically connected to the actuator for controlling an operation of the actuator.

4. The drivetrain of claim 1, further comprising a control module electrically connected to the engine, the transmission and the electric motor, the control module controlling an operation of the drivetrain between at least a first mode of operation and a second mode of operation, in the first mode of operation the electric motor drives the torque transmission shaft, the transmission is in the neutral shift position, and the engine is not operating, and in the second mode of operation, the engine drives the input shaft, the transmission is in one of the first and at least one higher shift position, the output shaft drives the torque transmission shaft, and the torque transmission shaft drives the electric motor.

5. The drivetrain of claim 4, further comprising a clutch selectively connecting the engine to the input shaft;

wherein the control module is electrically connected to the clutch; and wherein in the first mode of operation, the clutch is opened and in the second mode of operation, the clutch is closed.

6. The drivetrain of claim 4, wherein, prior to engaging the second mode of operation from the first mode of operation, the transmission is shifted from the neutral shift position to the highest shift position, as a result the torque transmission shaft drives the input shaft via the output shaft, and the input shaft drives the engine.

7. The drivetrain of claim 6, further comprising a clutch selectively connecting the engine to the input shaft;

wherein the control module is electrically connected to the clutch; and wherein prior to engaging the second mode of operation from the first mode of operation, the clutch is closed once or after the transmission is shifted directly from the neutral shift position to the highest shift position.

8. The drivetrain of claim 1, further comprising a clutch selectively connecting the engine to the input shaft.

9. The drivetrain of claim 1, further comprising a friction clutch operatively connecting the electric motor and the output shaft of the transmission to the torque transmission shaft.

10. A vehicle comprising:
a frame;
the drivetrain of claim 1 connected to the frame;
at least one other ground engaging element mounted to the frame; and
a seat.

11. The vehicle of claim 10, further comprising a battery electrically connected to the electric motor.

12. The vehicle of claim 11, wherein the battery is located under the engine.

13. The vehicle of claim 10, wherein the internal combustion engine is disposed forwardly of the electric motor.

14. The vehicle of claim 13, wherein the transmission is disposed longitudinally between the internal combustion engine and the electric motor.

15. A method of starting an internal combustion engine in a hybrid vehicle comprising the engine, an electric motor and a transmission, the method comprising:

driving an output shaft of the transmission and the vehicle with the electric motor;

shifting the transmission directly from a neutral shift position to a highest shift position;

driving the engine with an input shaft of the transmission only once or after the transmission is shifted directly from the neutral shift position to the highest shift position; and starting the engine once the engine is driven by the input shaft.

16. The method of claim 15, further comprising:

downshifting the transmission to a lower shift position once the transmission is shifted directly from the neutral shift position to the highest shift position;

wherein driving the engine with an input shaft of the transmission only once or after the transmission is shifted directly from the neutral shift position to the highest shift position includes driving the engine with the input shaft of the transmission only once the transmission is in the lower shift position.

17. The method of claim 15, wherein driving the engine with an input shaft of the transmission only once or after the transmission is shifted directly from the neutral shift position to the highest shift position includes closing a clutch selectively connecting the engine to the input shaft only once or after the transmission is shifted directly from the neutral shift position to the highest shift position.

18. A method of starting an internal combustion engine in a hybrid vehicle comprising the engine, an electric motor and a transmission, the method comprising:
- driving an output shaft of the transmission with the electric motor;
- initiating rotation of a crankshaft of the engine using a starter motor;
- shifting the transmission directly from a neutral shift position to a highest shift position after initiating rotation of the crankshaft using the starter motor; and
- driving the engine with an input shaft of the transmission once or after the transmission is shifted directly from the neutral shift position to the highest shift position.

19. The method of claim 18, further comprising:
- downshifting the transmission to a lower shift position once the transmission is shifted directly from the neutral shift position to the highest shift position;
- wherein driving the engine with an input shaft of the transmission once or after the transmission is shifted directly from the neutral shift position to the highest shift position includes driving the engine with the input shaft of the transmission once the transmission is in the lower shift position.

20. The method of claim 18, wherein driving the engine with an input shaft of the transmission once or after the transmission is shifted directly from the neutral shift position to the highest shift position includes closing a clutch selectively connecting the engine to the input shaft once or after the transmission is shifted directly from the neutral shift position to the highest shift position.

* * * * *